US011974249B2

(12) United States Patent
Wane et al.

(10) Patent No.: US 11,974,249 B2
(45) Date of Patent: Apr. 30, 2024

(54) SYSTEMS AND METHODS FOR DEPLOYMENT OF A DECENTRALIZED ELECTRONIC SUBSCRIBER IDENTITY MODULE

(71) Applicant: Bloxtel Inc., San Francisco, CA (US)

(72) Inventors: Ismaila Wane, San Francisco, CA (US); Karsten Ohme, Dresden (DE)

(73) Assignee: Bloxtel Inc., San Francisco, CA (US)

(*) Notice: Subject to any disclaimer, the term of this patent is extended or adjusted under 35 U.S.C. 154(b) by 0 days.

(21) Appl. No.: 18/307,637

(22) Filed: Apr. 26, 2023

(65) Prior Publication Data

US 2023/0397076 A1 Dec. 7, 2023

Related U.S. Application Data

(63) Continuation of application No. 18/306,096, filed on Apr. 24, 2023, now Pat. No. 11,770,788.
(Continued)

(51) Int. Cl.
*H04W 60/00* (2009.01)
*H04L 9/32* (2006.01)
(Continued)

(52) U.S. Cl.
CPC ........... *H04W 60/00* (2013.01); *H04L 9/3273* (2013.01); *H04W 8/18* (2013.01); *H04W 12/037* (2021.01);
(Continued)

(58) Field of Classification Search
None
See application file for complete search history.

(56) References Cited

U.S. PATENT DOCUMENTS 9,722,790 B2 8/2017 Ebrahimi
11,323,324 B2 5/2022 Dasgupta et al.
(Continued)

FOREIGN PATENT DOCUMENTS

CN 111385750 A 7/2020
EP 3579494 A1 12/2019
EP 3836525 A1 6/2021

OTHER PUBLICATIONS

Lei Liu, et al., Blockchain Based Spectrum Sharing over 6G Hybrid Cloud, 2021 International Wireless Communications and Mobile Computing (IWCMC), https://ieeexplore.ieee.org/document/9498978.
(Continued)

*Primary Examiner* — Rafael Perez-Gutierrez
*Assistant Examiner* — Frank E. Donado
(74) *Attorney, Agent, or Firm* — K&L Gates LLP

(57) ABSTRACT

Systems and methods are disclosed for a decentralized electronic subscriber identity module (dSIM) and an intelligent multi-chain offloading platform to leverage a plurality of decentralized blockchain-based cellular networks. In one embodiment, an AI-enabled offloading gateway can interconnect a plurality of mobile network operators with said decentralized blockchain-based cellular networks using a dSIM profile. The dSIM profile may contain symmetric and/or asymmetric network access applications, Proof-of-Coverage, and Quality-of-Service applications. The offloading gateway may include of various server nodes exposing network access and blockchain interfaces to mobile operators' systems and subscriber equipment containing dSIM profiles inside embedded or integrated universal integrated circuit cards (eUICCs/iUICCs).

21 Claims, 19 Drawing Sheets

Related U.S. Application Data

(60) Provisional application No. 63/348,497, filed on Jun. 3, 2022, provisional application No. 63/402,949, filed on Sep. 1, 2022.

(51) Int. Cl.
  *H04W 8/18* (2009.01)
  *H04W 12/037* (2021.01)
  *H04W 12/069* (2021.01)
  *H04W 12/72* (2021.01)
  *H04W 24/02* (2009.01)
  *H04W 36/22* (2009.01)
  *H04W 36/30* (2009.01)

(52) U.S. Cl.
  CPC ......... *H04W 12/069* (2021.01); *H04W 12/72* (2021.01); *H04W 24/02* (2013.01); *H04W 36/22* (2013.01); *H04W 36/304* (2023.05)

(56) References Cited

U.S. PATENT DOCUMENTS

| | | | |
|---|---|---|---|
| 2003/0163558 A1* | 8/2003 | Cao | H04L 43/12 709/223 |
| 2013/0103942 A1* | 4/2013 | Sullivan | H04L 9/0662 713/168 |
| 2018/0048738 A1 | 2/2018 | Hinds | |
| 2020/0226284 A1* | 7/2020 | Yin | G06F 16/9535 |
| 2020/0250590 A1* | 8/2020 | Augustine | G06F 16/9024 |
| 2020/0260349 A1* | 8/2020 | Crawford | H04L 9/3236 |
| 2022/0078601 A1* | 3/2022 | Poornachandran | H04W 76/15 |
| 2022/0159535 A1* | 5/2022 | Rahman | H04W 12/06 |
| 2022/0174059 A1* | 6/2022 | Fields | H04L 9/50 |
| 2023/0096163 A1* | 3/2023 | Narayanam | G06Q 10/06315 705/7.25 |
| 2023/0127913 A1* | 4/2023 | Khan | H04L 9/0822 380/28 |

OTHER PUBLICATIONS

Nicole Singh, What is the 5G Access and Mobility Management Function (AMF)?, https://techcommunity.microsoft.com/t5/azure-for-operators-blog/what-is-the-5g-access-and-mobility-management-function-amf/ba-p/3707685, Jan. 5, 2023.

Blockchain in Telecom: Which companies are leading the research?, https://www.greyb.com/companies-researching-blockchain-telecom-solutions/.

Daniel Palmer, Verizon Just Won a Patent to Create Virtual SIMs on a Blockchain, https://www.coindesk.com/markets/2019/09/20/verizon-just-won-a-patent-to-create-virtual-sims-on-a-blockchain/, Sep. 20, 2019.

* cited by examiner

SYSTEMS AND METHODS FOR DEPLOYMENT OF A DECENTRALIZED ELECTRONIC SUBSCRIBER IDENTITY MODULE

CROSS-REFERENCE TO RELATED APPLICATIONS

This application is a continuation of U.S. patent application Ser. No. 18/306,096, filed Apr. 24, 2023, which claims the benefit of U.S. Provisional Patent Application No. 63/348,497, filed Jun. 3, 2022, and U.S. Provisional Patent Application No. 63/402,949, filed Sep. 1, 2022. The entire contents of all of the above applications are incorporated herein.

TECHNICAL FIELD

Embodiments of the present disclosure relate generally to telecommunication systems, and more particularly, but not by way of limitation, to mechanisms allowing the offload of cellular network capacity onto decentralized, blockchain-based nodes using a decentralized electronic subscriber identity module (dSIM), which is an enhanced version of an electronic subscriber identity module (eSIM).

BACKGROUND

Telecommunications is a trillion-dollar annual sales revenue global industry with hundreds of mobile network operators (MNOs) serving billions of subscribers including internet-of-things (IoT) devices. The industry is characterized by various challenges, such as those outlined below.

The industry is capital intensive. There is a multi-billion-dollar total cost of ownership (TCO) due to high capital requirements to plan, deploy and maintain the network infrastructure from spectrum acquisition, real-estate leasing, equipment purchase and installation (e.g., antenna, gateways, SIM cards, subsidized user equipment, etc.), software (mobile network core, Over The Air (OTA) platform, subscription management, etc.), customer acquisition/retention marketing programs, etc.

There is a slow innovation cycle. Traditional operators don't code even with the advent of network functions virtualization and software-defined networking. Instead, they still rely on expensive, old-school, closed-source, 3rd party software vendors. Without owner's economics, it is hard to innovate quickly (and cost-effectively) at scale. Due to the high TCO and their return on investment (ROI) and net present value (NPV) requirements, mobile network operators are slow to roll out newer technologies such as 5G and therefore carefully prioritize their coverage areas. Simply put, ROI and NPV analyses dictate geographic rollout strategies and pricing.

A growing population creates enormous demand. Billions, and perhaps trillions of devices will exist in the future, whether for consumers or businesses, and will be hungry for data usage, while over 37% of the world at the time of this disclosure is still not connected to the mobile Internet.

Mobile data plans are expensive. The cost of cellular data ranges greatly around the world. As of 2022, it ranges from $0.04 per GB (the cheapest in Israel) up to $41.06 per GB (the most expensive is in the Islands of Saint Helena).

The quality of cellular connectivity is inconsistent. 4G download speeds are not uniform (e.g., 40-56 Mbps in Korea, 15-30 Mbps in US, 3-15 Mbps in India and 2-17 Mbps in Algeria). Similarly, latency, coverage, security, and support also greatly vary.

Current market conditions and technologies at the time of this disclosure have created a perfect storm for reshaping the entire telecommunications industry.

Shared cellular spectrum opens the market to any innovative entrant as a 4G/5G network operator. In the US, the Federal Communications Commission (FCC) allows the deployment of a mobile network in the Citizens Broadband Radio Service (CBRS) spectrum without acquiring a commercial license. The FCC also launched a $9B FCC 5G Fund for Rural America to help close the Digital Divide including $1B toward precision agriculture to help farmers increase the yields of their connected farms. Regulators around the world are following FCC footsteps to galvanize their local economies.

Most components required to build a cellular network are available as open-source software to any skilled-in-the-art engineer using off-the-shelf hardware. Magma, Open5GS and free5GC are all open-source projects implementing 5G mobile network cores.

eSIMs make it possible to remotely and frictionlessly acquire new subscribers. eSIMs also eliminate the logistical challenges associated with sourcing, stocking, and distributing the billions of physical SIM cards produced each year.

Blockchain mechanisms are quickly proving to be very effective in establishing both economic and technical frameworks for building cost-effective and secure decentralized mobile network nodes. They can significantly reduce network deployment and management costs.

More novel blockchain protocols are also now being introduced to entirely reshape the trillion-dollar telecom industry. It is highly anticipated that in the near future more blockchain hotspots will be available for offloading than independent legacy cell towers. Most major mobile network have taken notice, but struggle to put together a cohesive strategy to adopt blockchain technology towards a Zero CAPEX model. A Zero CAPEX model means that there will be ultimately a day a mobile network operator is just a decentralized autonomous organization (DAO) that fully leverages blockchain-based cellular networks, decentralized network core and artificial intelligence to bring capital (i.e., CAPEX) and even operational expenses (i.e., OPEX) to near zero. This would make connectivity more affordable and accessible to billions of people and things around the world.

To accomplish this vision, the first step is of course to help mobile operators adopt blockchain as they struggle navigating its complex landscape. There are potentially thousands of blockchain protocols, thousands of smart contract virtual machines, thousands of crowdsourced network equipment, hundreds of wallets and crypto exchange platforms, thousands of cryptocurrencies, and hundreds of millions, soon billions of crypto miners and users to deal with for mobile operators.

Operators' concerns relate specifically to streamlined access to and settlement with these decentralized networks. Service level agreements (SLAs), security, privacy, and quality-of-service (QoS) are also very important factors for mobile operators before establishing offloading contracts with use-case specific policies for their subscribers' devices.

Addressing these concerns are critical to allow the success of decentralized networks. The herein invention presents therefore novel technical solutions to these challenges.

BRIEF SUMMARY

Systems and methods are described herein to help mobile operators adopt decentralized cellular networks using an intelligent multi-chain offloading cellular gateway platform and a dSIM.

Example embodiments combine systems and methods for a multi-chain offloading platform leveraging a plurality of decentralized blockchain-based mobile network nodes with access provided via a decentralized eSIM. In one example embodiment, an offloading cellular gateway platform can interconnect, via dedicated IP tunnels, a plurality of mobile network operators with said decentralized blockchain-based mobile networks. Said offloading cellular gateway platform consists of various centralized and/or decentralized servers exposing standard network and blockchain interfaces to mobile network operator's systems and subscriber (user) equipment.

In one example implementation an apparatus is provided including communications hardware configured to enable wireless communication by the apparatus and a universal integrated circuit card (UICC) storing a decentralized electronic subscriber identity module (dSIM) that hosts an authentication application, a Proof-of-Coverage application (PCA), and a Quality-of-Service application (QSA). Operation of the authentication application, the PCA, and the QSA enable the apparatus to gather network coverage and quality data and optimize resource utilization and network selection from a plurality of decentralized cellular networks.

In some embodiments, the authentication application comprises a decentralized authentication application (DAA) enabling asymmetric authentication between the dSIM and an offloading gateway using public keys and a private key stored in a file system of the UICC. In some such embodiments, the DAA is configured to enable mutual authentication of the apparatus with the offloading gateway using the private key stored in the file system of the UICC and a public key of the offloading gateway, wherein the apparatus is further configured to transmit an output file to the offloading gateway via a mutually authenticated session. Additionally, or alternatively, the dSIM further hosts a Network Access Application (NAA) enabling symmetric authentication with a traditional mobile network.

In some embodiments, the UICC comprises an electronic UICC (eUICC) or an integrated UICC (iUICC).

Furthermore, the dSIM may be configured to enable registration of the apparatus in response to a network attachment event. For instance, the registration of the apparatus may include personalization of the dSIM based on a diversification parameter including a personalization token provided by a remote server connected to a blockchain.

In some embodiments, the dSIM includes a derived unique identifier rather than an Integrated Circuit Card Identifier (ICCID) associated with the UICC, and wherein the dSIM is configured to use the derived unique identifier as a subscriber network access identifier for protecting privacy of the apparatus during implementation of Proof-of-Coverage operations. In some such embodiments, the derived unique identifier comprises a Globally Unique Temporary User Equipment Identity (GUTI).

In some embodiments, the PCA is configured to securely exchange Proof-of-Coverage information over a wireless interface with an offloading gateway. For instance, the PCA may be further configured to collect network attachment information in response to a triggering event, wherein the Proof-of-Coverage information comprises the network attachment information. In this regard, the triggering event may comprise expiration of a polling interval or an indication of a new challenge relating to an access gateway to which the apparatus is attached. Additionally, the network attachment information may include a date stamp, a time stamp, a cell ID, location information, a derived unique identifier of the apparatus, a challenge, or a combination thereof.

In some embodiments, the QSA is configured to securely exchange Proof-of-Quality information over a wireless interface with an offloading gateway. In some such embodiments, the QSA is configured to capture network measurements in response to a triggering event, wherein the Proof-of-Quality information comprises the network measurements. The triggering event may comprise expiration of a polling interval or an indication of a new network attachment.

In some embodiments, the Proof-of-Quality information comprises a score for an attached access gateway.

Additionally, the dSIM may further hosts an artificial neural network trained to autonomously connect with blockchain-based mobile networks.

Furthermore, the dSIM may securely exchange information with an offloading gateway using a binary tag-length-value encoded scheme.

In some embodiments, the communications hardware is configured to present information in a graphical-user interface by visually overlaying the information upon live map information. Furthermore, the communications hardware may be configured to overlay scores or network measurement results upon the live map information. To this end, overlaying the scores or the network measurement results upon the live map information may include displaying augmented-reality access point areas that can be expanded for further visualization and interaction.

As another example implementation, a method is provided that involves registering a user equipment by a universal integrated circuit card (UICC) of the user equipment. In such an implementation, the UICC may store a decentralized electronic subscriber identity module (dSIM) that hosts an authentication application, a Proof-of-Coverage application (PCA), and a Quality-of-Service application (QSA). The method further includes, in response to a network attachment event, securely transmitting, by the PCA, Proof-of-Coverage information over a wireless interface with an offloading gateway, and securely exchanging, by the QSA, Proof-of-Quality information over the wireless interface with the offloading gateway. The user equipment performing this method may be the subscriber equipment described herein.

As yet another example implementation, an offloading gateway of a platform server is provided. The offloading gateway comprises an artificial intelligence system, a cellular network interface, and a blockchain interface. The artificial intelligence system is configured to facilitate, in conjunction with the cellular network interface and the blockchain interface, handover between access gateways associated with a plurality of blockchain-based mobile networks.

In some embodiments, the cellular network interface is configured to enable communication with a user equipment using electronic subscription identity module applications installed in a universal integrated circuit chip of the user equipment to securely exchange proof-of-coverage and proof-of-quality information between the offloading gateway and the user equipment. To this end, securely exchanging information between the offloading gateway and the user equipment may include using asymmetric keys for mutual authentication, sharing auditable network measurement tasks, and/or assigning scores to all decentralized network nodes visited by the user equipment.

In some embodiments, the blockchain interface is configured to facilitate signature, by the offloading gateway, of one or more smart contracts governing handover between the access gateways associated with the plurality of blockchain-based mobile networks. Additionally, execution, by a remote server, of a smart contract signed by the offloading gateway may cause automatic initiation of a handover of a user equipment based on rules established by the smart contract. In this regard, the remote server may be hosted in a cloud or by a local access gateway connected to a cellular antenna communicating with the user equipment over a radio interface, wherein the cellular network interface is configured to interact with the remote server to facilitate handover of the user equipment. Moreover, the cellular network interface may be configured to interact with the user equipment to facilitate asynchronous performance, by the user equipment, of proof-of-coverage and proof-of-quality operations.

In some embodiments, the cellular network interface is configured to securely exchange information, with a dedicated chip installed into the user equipment, using a binary tag-length-value encoded scheme, and based on knowledge of a corresponding specific low-level instruction set. To this end, the cellular network interface may be configured to enable receipt of an output file from a user interface via a mutually authenticated session, wherein the mutually authenticated session is established through exchange of session keys derived from asymmetric secret keys stored locally at the offloading gateway and the user equipment in a tamper-resistant hardware. In various embodiments, the tamper-resistant hardware comprises one or more smart cards. In various embodiments, the tamper-resistant hardware may comprise embedded or integrated universal integral circuit chip cards. The user equipment may authenticate to the offloading gateway using asymmetric keys stored locally in the tamper-resistant hardware.

In some embodiments, the artificial intelligence system comprises an artificial neural network in conjunction with a Java Card applet configured locally with a trained artificial neural network that is also used by a remote server to autonomously connect with blockchain-based mobile networks.

In another example implementation, a method is provided for facilitating handover between access gateways associated with a plurality of blockchain-based mobile networks by an offloading gateway comprising an artificial intelligence system, a cellular network interface, and a blockchain interface. The method may include communicating, via the cellular network interface, with a user equipment using electronic subscription identity module applications installed in a universal integrated circuit chip of the user equipment to securely exchange proof-of-coverage and proof-of-quality information between the offloading gateway and the user equipment.

In some embodiments, securely exchanging information between the offloading gateway and the user equipment may include using asymmetric keys for mutual authentication, sharing auditable network measurement tasks, and assigning scores to all decentralized network nodes visited by the user equipment.

In some embodiments, the method further includes facilitating, by the blockchain interface, signature of one or more smart contracts by the offloading gateway, wherein the one or more smart contracts govern handover between the access gateways associated with the plurality of blockchain-based mobile networks.

In some embodiments, the method further includes securely exchanging, by the cellular network interface, information with a dedicated chip installed into the user equipment using a binary tag-length-value encoded scheme and based on knowledge of a corresponding specific low-level instruction set. Additionally, the method may include receiving, by the cellular network interface, an output file from a user interface via a mutually authenticated session, wherein the mutually authenticated session is established through exchange of session keys derived from asymmetric secret keys stored locally at the offloading gateway and the user equipment in tamper-resistant hardware. As noted elsewhere, the tamper-resistant hardware comprises one or more smart cards.

In some embodiments, the artificial intelligence system comprises an artificial neural network in conjunction with a Java Card applet configured locally with a trained artificial neural network that is also used by a remote server to autonomously connect with blockchain-based mobile networks.

The foregoing summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

High-Level Implementation

Figure 1A:
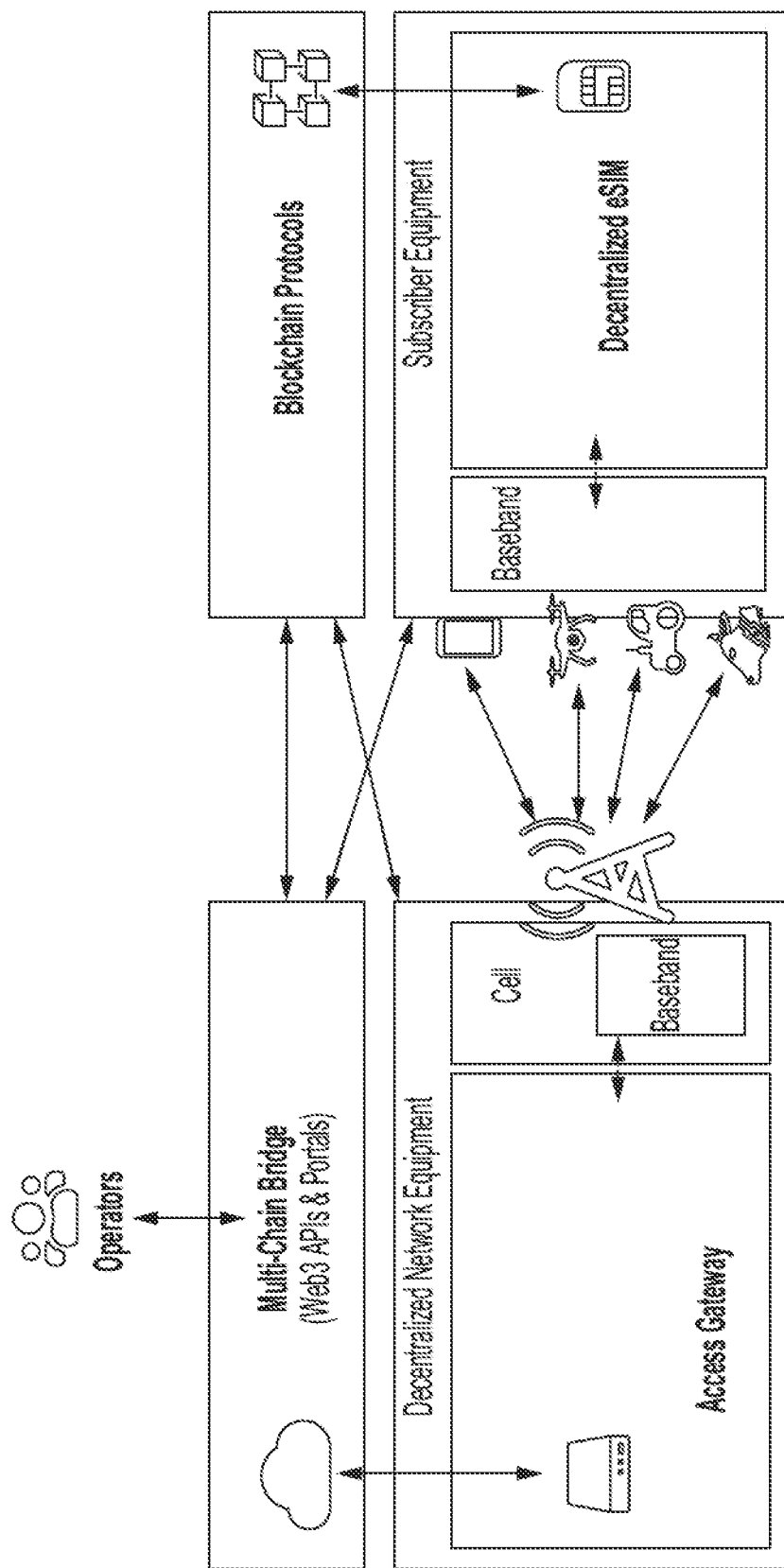
FIG. 1A illustrates a high-level architecture of an offloading cellular gateway platform that may be used in example embodiments described herein.
Figure 1B:
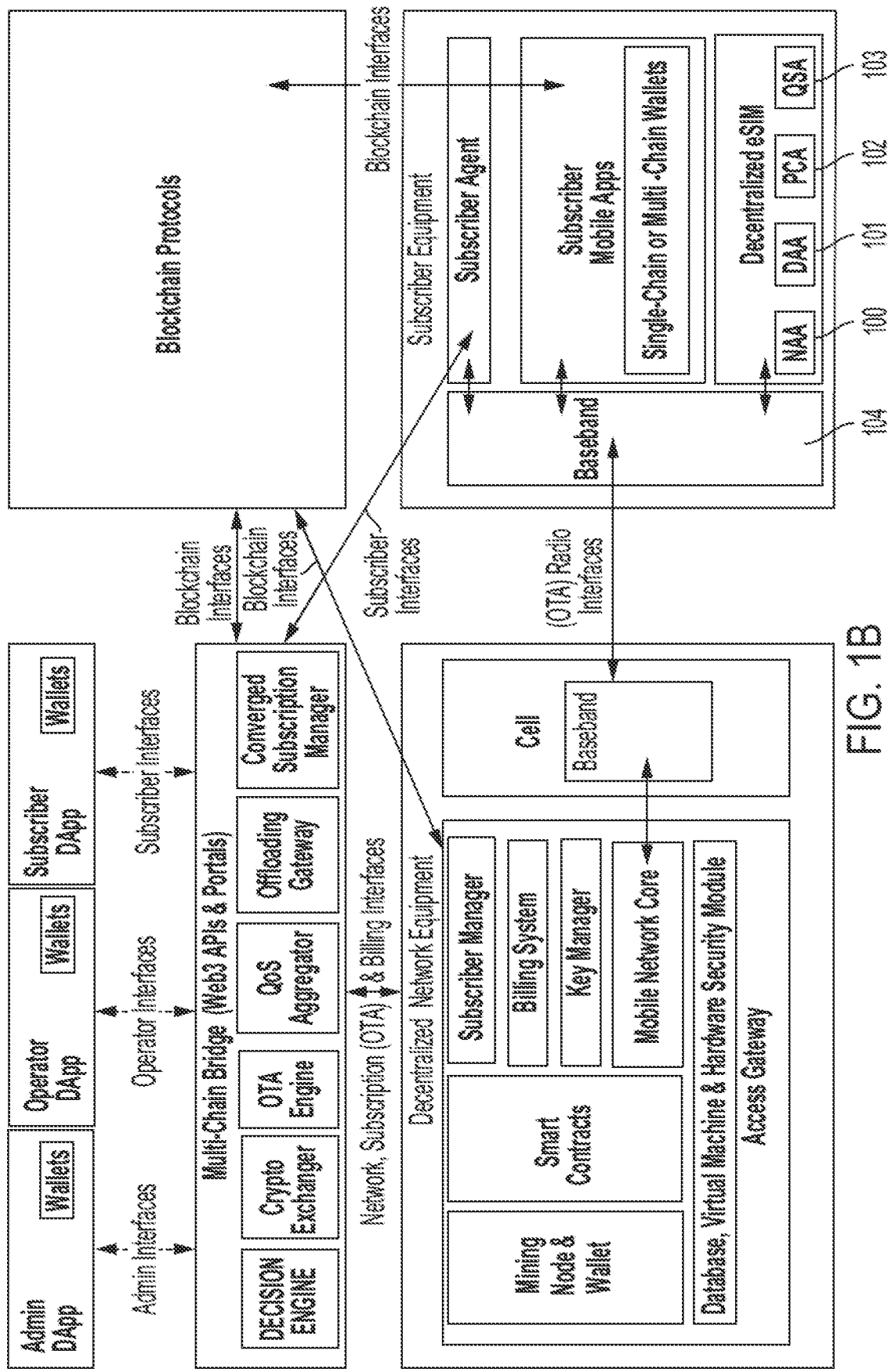
FIG. 1B illustrates components of the offloading cellular gateway platform, as well as of an example dSIM that may be used in example embodiments described herein.

As noted previously, example embodiments set forth herein provide systems and methods for deployment and utilization of a dSIM to enable mobile network operators to utilize decentralized cellular networks. As shown in FIGS. 1A and 1B, a high-level illustration of an example implementation includes at least three components that enable a mobile network operator to utilize decentralized cellular networks to interact with a subscriber equipment: a multi-chain bridge, an access gateway, a set of blockchain protocols automating the interaction among the various components within the system.

The multi-chain bridge (which may be referred to as an oracle) facilitates communication by the various MNOs with various nodes in the decentralized network in a transparent fashion. The multi-chain bridge may provide offloading services that provide network integration, as well as billing) integration with multiple blockchain systems. In addition, the multi-chain bridge provides attestation services to verify integrity of the decentralized cellular network via proofs of coverage and quality, as will be discussed in greater detail below.

To enable interaction with a decentralized cellular network, the subscriber equipment may have additional software applications installed thereon. As shown in FIG. 1B, rather than simply utilize a SIM card or eSIM, the subscriber equipment may additionally store and utilize a decentralized eSIM (i.e., a dSIM), which may offer additional functionality. Specifically, in addition to a traditional Network Access Application (NAA) 100 for 4G/LTE and 5G authentication, the dSIM may additionally include a Decentralized Access Application (DAA) 101 to enable secure interaction with other entities in the decentralized cellular network, as well as a Proof-of-Coverage Application (PCA) 102 and a Quality-of-Service Application (QSA) 103 that, together, facilitate the measurement of network integrity for the benefit of the various parties that utilize the decentralized cellular network.

Automating interaction of the various operators, network nodes, and subscriber equipment is a blockchain system comprising a set of blockchain protocols (which may be based on an existing or a custom blockchain). The subscriber equipment may also host a single-chain or multi-chain wallet that enables interaction with the blockchain protocols. Similarly, the multi-chain bridge may provide a seamless interface between the various operators and the various blockchain protocols used by the blockchains utilized throughout the decentralized cellular network.

System Architecture

Figure 2:
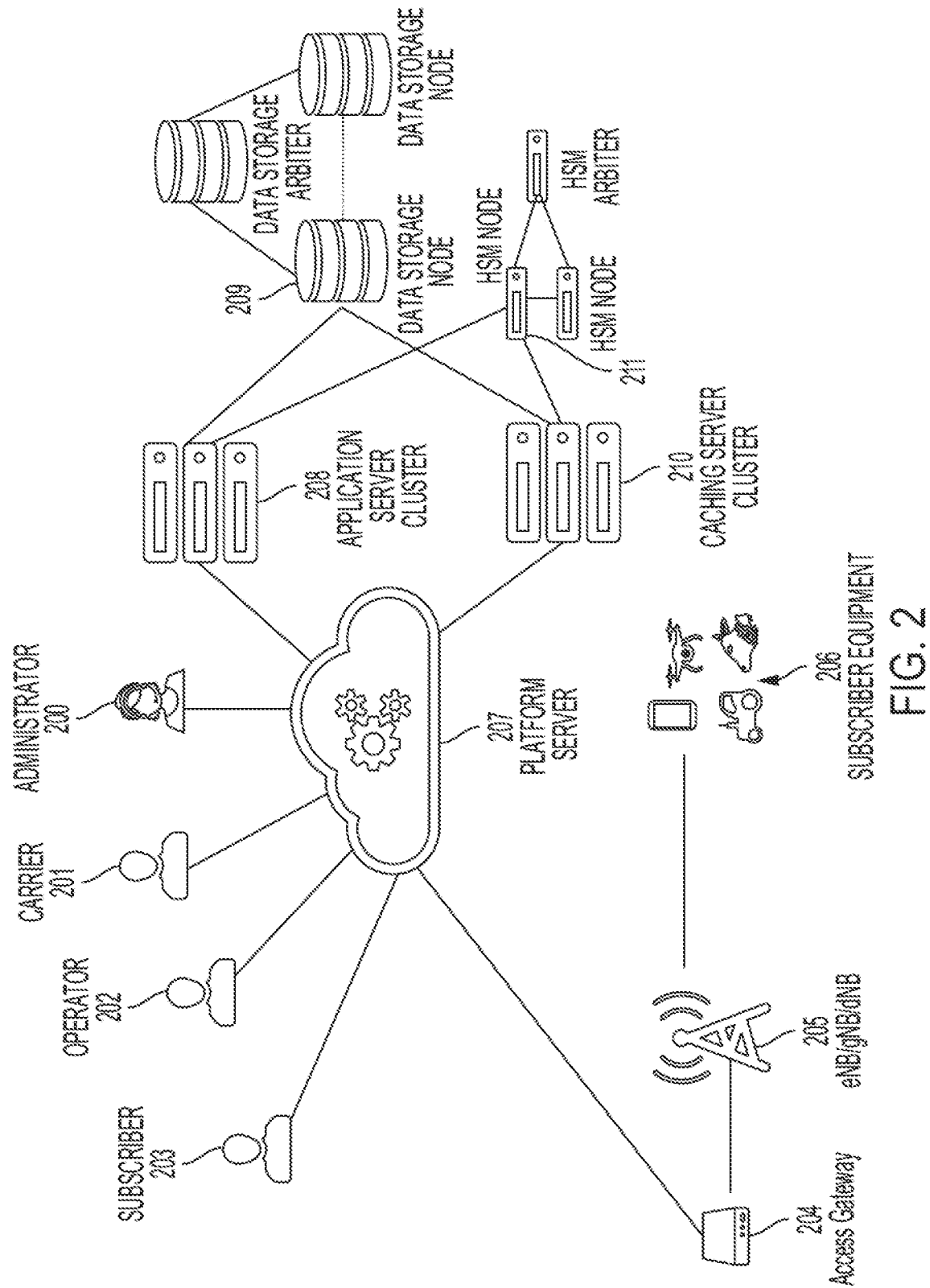
FIG. 2 illustrates an offloading cellular gateway platform with users and elements that may interact in an example deployment of various embodiments described herein.

Referring now to FIG. 2, an example offloading cellular gateway platform is illustrated in conjunction with some example users and elements with which it may interact. The offloading cellular gateway platform (which may at times be referred to as just the platform) primarily consists of a server application (also referred to as platform server 207 or as a multi-chain bridge) running on various server hardware (e.g., using on-demand cloud computing and storage platform such as Amazon Web Services or Google Cloud Platform, or via dedicated local resources). The server application may comprise an application server cluster 208 and/or a caching server cluster 210, and the server application may access one or more data storage node 209 and/or HSM 211 to facilitate its various operations. The server application may interact, via an access gateway 204 and base station (e.g., eNB/gNB/dNB 205) with a client application (also referred to as a subscriber agent) running on a plurality of user equipment (smart phone, smart watch, vehicles, camera, etc., and which may also be referred to as subscriber equipment 206) and a special eSIM profile (also referred to as a decentralized eSIM profile, or dSIM) consisting of various dedicated applets (NAA, DAA, PCA, QSA) running on an embedded Universal Integrated Circuit Card (eUICC). It is worth noting that the dSIM profile can also run on an integrated Universal Integrated Circuit Card (iUICC). It will be understood that each UICC includes at least a processor and memory that may store different applets and authentication data that the subscriber equipment can use to register and access services of the wireless service providers. An eUICC may be embedded into a system board of the user equipment, whereas an iUICC may be a separate hardware component combined with the baseband module of the user equipment.

Figure 3:
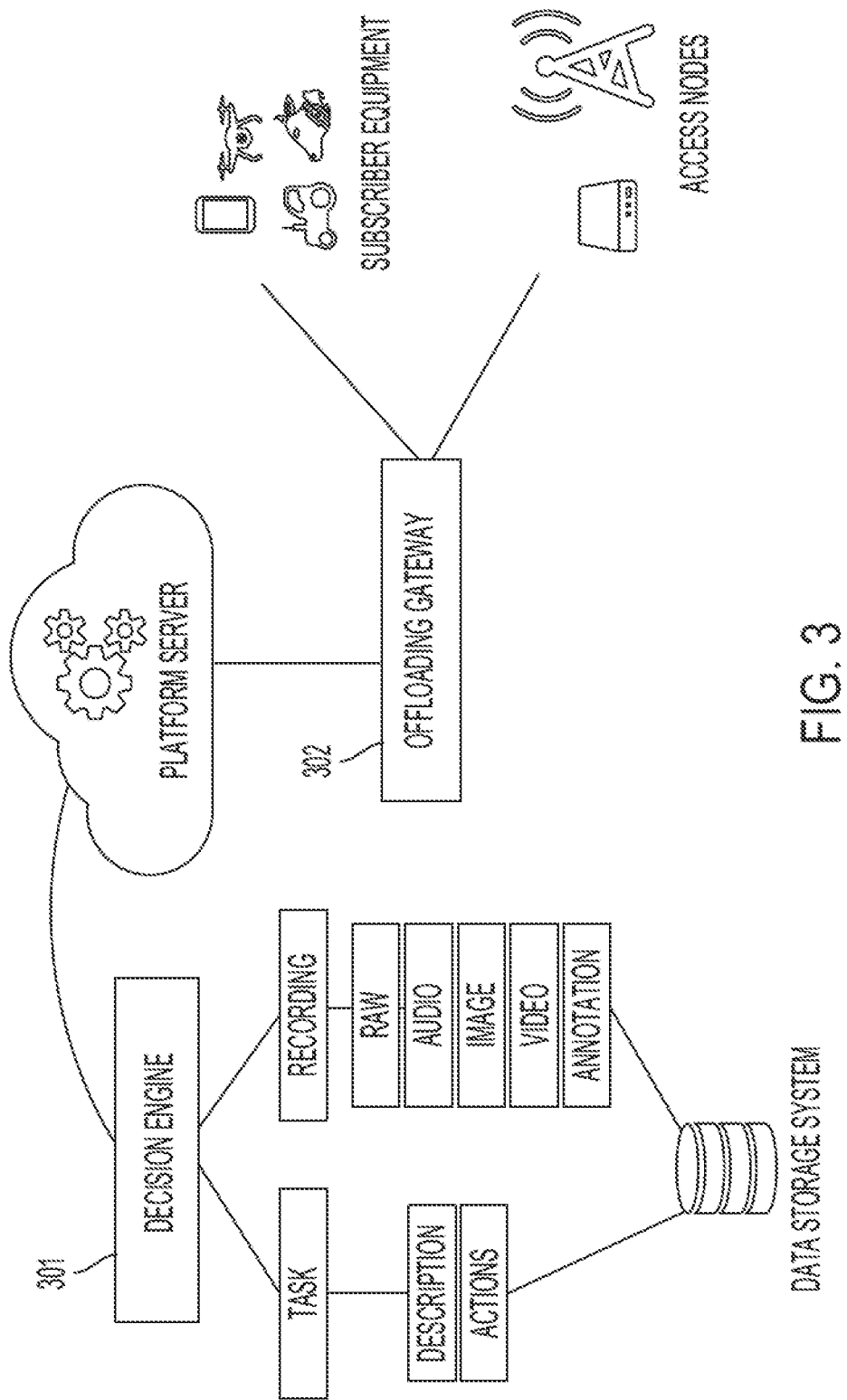
FIG. 3 illustrates a network diagram depicting the offloading cellular gateway platform in connection with offloading, decision, and access engines.

The platform server 207 includes both front-end and back-end web systems. It may be implemented and deployed using standard web technologies such as Node.js, Go, Redis (for caching), Angular, etc. The platform server 207 further includes at least the following core modules: a decision engine (e.g., decision engine 301 shown in FIG. 3), crypto exchanger (e.g., for providing crypto rewards), OTA engine (e.g., to facilitate certain communication with subscriber equipment), QoS aggregator (e.g., to gather QoS information from various devices interacting with various decentralized access gateways), an offloading gateway (e.g., offloading gateway 302 shown in FIG. 3), and converged subscription manager, as illustrated in FIG. 1B.

The front-end web system provides a presentation layer to administrators, carriers, operators, and subscribers. The presentation layer may be a password-protected user-interface for registering and logging into portals. Depending on the user type, these portals many different capabilities, such as the following.

The portals may allow an administrator 200 (as illustrated in FIG. 2) to set configuration parameters for the platform and monitor various operations based on their privileges (e.g., customer support, solution/support engineer, developer, etc.).

The portals may further enable a carrier 201 (as illustrated in FIG. 2), that owns and manages one or multiple cell towers from their residence, office, or dedicated area to view and manage KPIs such as the quality of their access gateways and microcells. Recommendations on how to improve and maintain their KPIs to required service levels may also be provided via these portals.

The portals may enable an operator 202 (as illustrated in FIG. 2) to create dSIM profiles, plans, discounts and sign smart contracts for offloading on selected blockchains. The operator 202 may therefore be able to select blockchains and nodes to offload onto by visualizing target coverage areas and analyzing QoS data points for access points. Operators 202 may further track their own KPIs, such as number of downloaded dSIMs, revenue on purchased plans, data usage, promotion results and earned rewards as a participant member of the blockchain onto which it offloads.

Further, the portals may enable a subscriber 203 (as illustrated in FIG. 2), such as an individual or an enterprise, to buy connectivity plans on the web and remotely deploy associated dSIM into one or a plurality of devices. Subscribers 203 can use their online wallets (e.g., MetaMask, Coinbase, etc.) to buy credits and, if available, cash out their balance. They can optionally earn rewards as a participant member on a given blockchain while using data.

The back-end web systems use web2 and/or web3 technologies to provide a restricted Application Programming Interface (API) to the front-end web systems as well as other client devices. The back-end web system consists of a database (e.g., MongoDB for centralized configuration or adapted GunDB-variant for a decentralized configuration) maintaining user profiles (e.g., for administrator 200, carrier 201, operator 202, subscriber 203, etc.), wallet addresses, dSIM profile identifiers, applet identifiers, cell identifiers, invoices, etc.

The back-end web system also maintains, in one or more centralized or decentralized data storage nodes 209, a list of tasks corresponding to a given offloading task. These tasks are automatically generated by the decision engine 301 (illustrated in FIG. 3) when a subscriber (e.g., subscriber 203) buys a prepaid or postpaid plan, downloads one or a multitude of eSIMs provisioned remotely into one or a multitude of user equipment. Intelligent offloading tasks may include, but are not limited to, autonomously preparing a dSIM profile with relevant configuration information (including network access keys, proof-of-coverage, and proof-of-quality keys), issuing smart contracts, etc. In another embodiment, the subscriber 203 may select its tariffed network policies (acceptable upload/download speeds, latencies, etc.) and other custom tasks which will be added to the list of tasks associated with their connectivity plans. In that case, a smart contract is created between the subscriber 203 and the operator 202.

The back-end web system also maintains in its data storage nodes 209 a list of uploaded proof-of-coverage and proof-of-quality measurements uniquely identified with a Universally Unique Identifier (UUID) number. Measurements can be raw binary or text records, image files, video files, audio files or other sensor data files. Each measurement item includes metadata such as title, description, date/time, location, etc. Each measurement item is assigned a predefined tag by the administrator 200 with other annotations. A measurement file is generally associated with a given task for a given offloading activity. Measurements are uploaded either by a front-end web system of the platform server 207 or by client devices to a secure, predefined repository accessible only by authorized administrators 200. The measurements may be securely exchanged using a binary tag-length-value (TLV) encoded scheme and processed with knowledge of a specific low-level instruction set between the offloading gateway (e.g., a component of the platform server 207) and the dedicated chip installed into a user equipment. For instance, the QSA of subscriber equipment 206 may send data to platform server 207 in binary format using a tag first, then the length of the data and the value of the data. Example tags may include TAG_COUNTER, TAG_DATE_TIME, TAG_ACCESS_TECHNOLOGY, TAG_LOCATION_INFORMATION, TAG_NMR, TAG_TIMING, TAG_GUTI, and TAG_GEO_LOCATION.

The subscriber equipment 206 can be used to access the front-end system (e.g., a password protected HTML5 portal) of the platform server 207 or it can natively run instances of the subscriber agent as an app (e.g., an Android app, iOS app, etc.). The subscriber agent has remote authorized access via a private key to the server application over a secure HTTPS channel using restricted REST APIs.

The subscriber agent application can be hosted in a variety of subscriber equipment, such as a smartphone, robot, autonomous drone, tractor, livestock tracker, etc. These devices are equipped preferably with an eUICC or iUICC. It will be noted, however, that alternative implementations can utilize a special UICC with similar features (e.g., cryptographic algorithms). The subscriber agent is generally a headless (without UI) software but can be enhanced to provide a UI to the subscriber if a display panel is available in the device. The subscriber agent may also reside inside the modem's firmware (i.e., Baseband 104 in FIG. 1B) or installed as a system application in the user equipment (i.e., the subscriber agent may be preloaded as a system application by the OEM). This would ensure that it is tightly integrated with the modem's internal APIs to better collect network measurement reports.

When the subscriber agent application is hosted in a smartphone, the subscriber agent application consists of a graphical user interface (GUI) similar to the server application front-end web system. The subscriber agent in this implementation may leverage the native operating system (e.g., Android, iOS) and existing features to display a GUI to the subscriber. The subscriber agent's purpose is to act as a virtual connectivity assistant. The subscriber agent residing in a smartphone can be downloaded from an app store such as Google's Play Store or Apple's App Store. Other configuration files, also referred to as output files, can be remotely provisioned to the subscriber agent directly and securely from the server application. These output files can be serialized versions of the network configurations with some additional metadata.

The security mechanism for the provisioning of output files consists of an exchange of session keys derived from a key set managed and stored via a Hardware Security Module (HSM), illustrated in FIG. 2 as HSM 211, accessed by the platform server 207 and a keyset managed and stored locally (i.e., within the subscriber equipment 206) in a tamper-resistant system accessible to the subscriber agent. The tamper-resistant system can be a dedicated security module such as a removable, embedded, or integrated smart card in the device. The embedded or integrated smart card can be hardware-based or software-based.

Example Platform Server and dSIM Interactions

The dSIM profile residing in the eUICC (or iUICC) of a subscriber equipment may be provisioned and managed by a converged subscription manager (which may support both push and pull modes for remote SIM provisioning per GSMA specifications). The dSIM profile consists of a NAA (which may be the standard symmetric Network Access Application for 4G/LTE and 5G), a DAA (which is a non-standard asymmetric Decentralized Access Application for 4G/LTE, 5G and beyond), a QSA, and an PCA, as illustrated in FIG. 1B.

The eUICC (or iUICC) supports at least Java Card 2.2.1+ with USIM/UICC API ETSI Release 8 or higher. It should allow access to the Card Application Toolkit (CAT) (ETSI TS 102 223 and ETSI TS 131 111) and the file system of the eUICC/iUICC (ETSI TS 102 221). In order to perform personalization, secure communication and signature operations, the eUICC/iUICC runtime environment provides cryptographic support for Secure Hash Algorithm (SHA) algorithms such as SHA-256, Advanced Encryption Standard (AES) algorithms such as AES-128 and/or Elliptic Curve Cryptography (ECC) or similar qualified algorithms.

The QSA may be a Java Card applet that includes an implementation of ETSI TS 123 107 Quality of Service concept and architecture. In addition, the QSA may utilize Subscriber Identity Module Application Programming Interface (SIM API) defined by ETSI TS 101 476.

Upon installation, the dSIM profile may create a PKI certificate and then send a TERMINAL PROFILE command to determine if the subscriber equipment is capable of handling PROACTIVE commands. If so, then the dSIM profile sends PROACTIVE commands (including AT Commands) to the modem/terminal.

More specifically, in the processToolkit methods of the dSIM profile applets, a proactive handler reference is acquired to send PROACTIVE commands to the modem such as PRO_CMD_SEND_SHORT_MESSAGE, PRO_CMD_PROVIDE_LOCAL_INFORMATION, and PRO_CMD_RUN_AT_COMMAND.

A description of some such commands is as follows.
EVENT_EVENT_DOWNLOAD_LOCATION_STATUS: Register this event on install method, and the QSA will receive the event when there is a location update in the process Toolkit method.
PRO_CMD_PROVIDE_LOCAL_INFORMATION: proactive command, with qualifier set to '00' (Location Information/MCC, MNC, LAC/TAC and Cell Identity). The QSA can then decode the MCC, MNC, LAC and CELL ID.
PRO_CMD_RUN_AT_COMMAND: proactive command defined in ETSI TS 127 007 (AT command set for User Equipment) to retrieve Signal Quality (e.g., +CSQ, +CESQ=? (RSRQ, RSRP), etc.). ETSI TS 102 223 (Card Application Toolkit (CAT)).
RUN AT COMMAND (if class 'b' is supported)
Default network signal measurements, which can be collected by the QSA, include at least RSRP and RSRQ.
RSRP, which stands for Reference Signal Received Power, is used when measuring signal strength of a cellular connection. An RSRP with a value of −80 dBm is an excellent signal whereas a value of −100 dBm means there is no signal.
RSRQ, which stands for Reference Signal Received Quality, is used when measuring signal quality (i.e., reliability) of a cellular connection. An RSRQ of −10 dB is an excellent signal, whereas −20 dB is no signal.
Computations for network upload and download speeds can be performed asynchronously by the subscriber agent. These measurements are then recorded by the platform. In some implementations, these computations are performed by the QSA.

The method for performing data speed measurements (uplink/downlink) using a Java Card applet are non-trivial, and may include the following steps:
The platform server 207 sends a test payload data to the QSA depending on available access network technology and available buffer size, and the modem notifies the UICC when a full Service Data Unit (SDU) is available using a DATA AVAILABLE event;
The eUICC/iUICC notifies the platform server 207 that data was received without fetching the data;
The platform server 207 determines the expected data has been received;
The eUICC/iUICC closes the channel and indicates that the channel is opened with the next command again: this should wipe the buffer without fetching it; and/or
The platform server 207 calculates download time subtracting latency.

Figure 4:
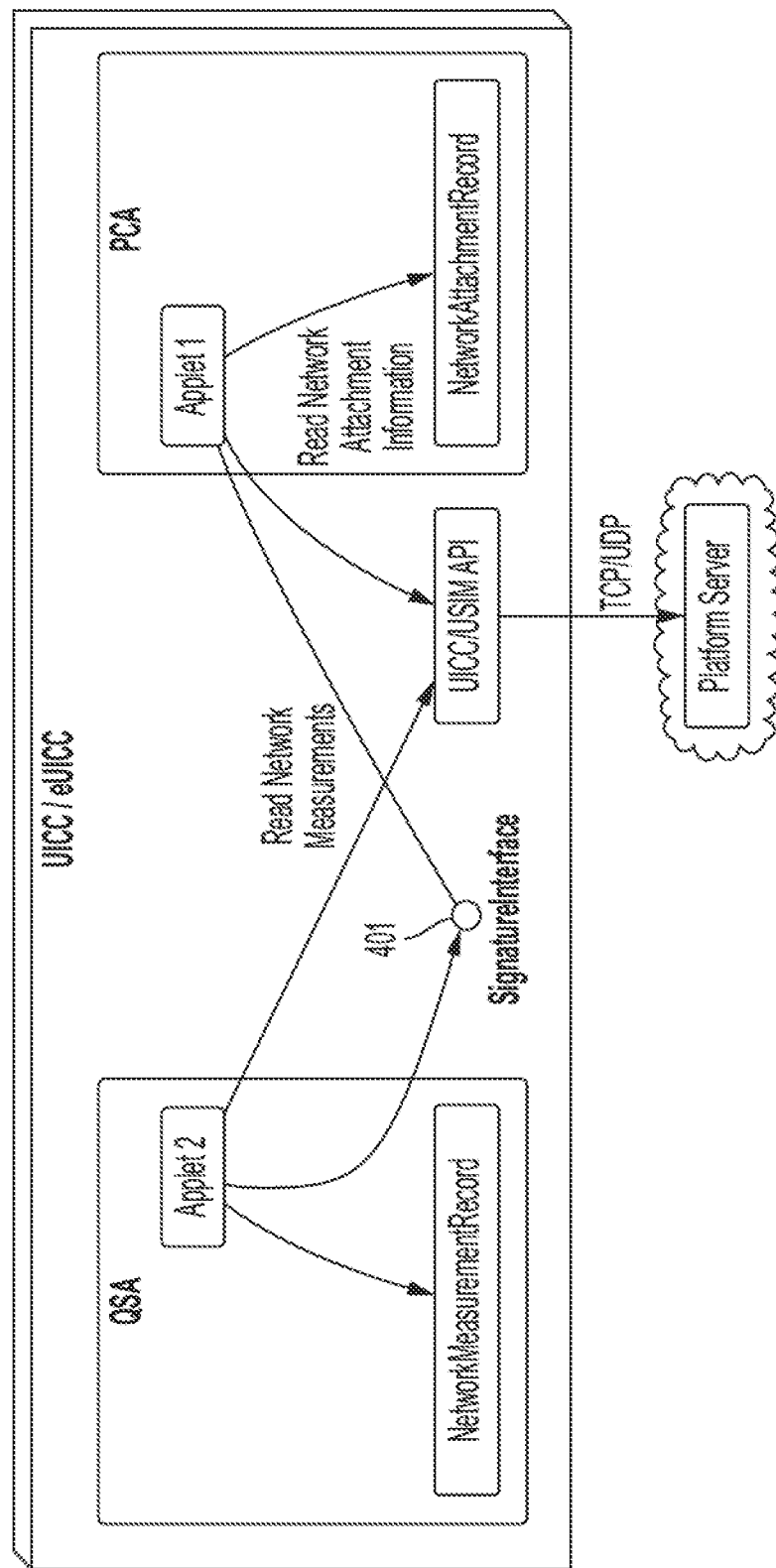
FIG. 4 illustrates example roles and relationships between applets inside the eUICC/iUICC, in accordance with some example embodiments described herein.

The PCA shares a signature interface (Java Card Shareable Interface or similar mechanism) illustrated as interface 401 in FIG. 4 to allow associated applets (e.g., the QSA, DAA) to utilize this functionality for signature operations. In order to efficiently manage low-memory and low-CPU availability, the dSIM (DAA, PCA, QSA) stores keys, state and configuration in the secure filesystem of the eUICC/iUICC. More specifically, during applet update, this would have the effect of not resetting data. Storage of this data by the dSIM includes one or more of the following:
Storing a generated ECC key pair (public and private keys) in a secure file system;
Reading a personalization token from the file system as a 2nd option (after getting it as an installation (e.g., diversification) parameter);
Storing a personalization token in the file system;
Storing a personalization status in the file system;
Storing a counter in the file system;
Reading a server IP address from the file system as a 2nd option (after getting it as installation parameter);
Storing a server IP address in the file system;
Reading a personalization status from the file system during reinstall; and/or
Reading a counter from file system during reinstall.

The PCA and the QSA may use functionalities offered by the modem and the eUICC/iUICC itself (as defined in ETSI TS 102 223, ETSI TS 131 111, ETSI TS 102 221) to query information of the file system, network related data, location information and date information.

The PCA is mostly data proofing the network attachment such as the location information including the cell ID and the unique network attachment ID, such as the GUTI.

GUTI is an acronym for Globally Unique Temporary UE Identity. It helps identify the subscriber in a more secure manner, as it is unique and temporary, in contrast to the Integrated Circuit Card Identifier (ICCID) (or International Mobile Subscriber Identity (IMSI)) of a device. In some implementations, GUTI may be used as the unique network attachment identifier, which is also assigned by the MME in a 4G/LTE and 5G NSA mode. In a 5G SA mode, the Access and Mobility Management Function (AMF) assigns the GUTI. As a decentralized network's asset, the GUTI is more suitable to be published in the blockchain than mobile operator's assets such as an Integrated Circuit Card Identifier (ICCID) (or International Mobile Subscriber Identity (IMSI)), as it protects the subscriber's privacy.

The following information CAT commands may be used:
PROVIDE LOCATION [Date, time and time zone]; and
PROVIDE LOCATION [Location Information].
The following files from the UICC may be read:

EFLOCI;
EFEPSLOCI; and/or
EF5GS3GPPLOCI.

The QSA is collecting additional information such as signal quality information, geolocation information, and network technology. The following information CAT commands may be used:

PROVIDE LOCATION [Date, time and time zone];
PROVIDE LOCATION [Location Information];
PROVIDE LOCATION [Access Technology];
PROVIDE LOCATION [Network Measurement reports];
PROVIDE LOCATION [IMEI]; and/or
Geographical Location Request.

The following files from the eUICC/iUICC may be read:
EFLOCI;
EFEPSLOCI; and
EF5GS3GPPLOCI.

The QSA may periodically collect this information when connected to a network, while the PCA is only collecting this information when attaching to a network. For periodically collecting the information, the following CAT commands are used:

POLL INTERVAL.

In one implementation, information is sent by the PCA and QSA using the Bearer Independent Protocol (BIP) using Transmission Control Protocol (TCP) or UDP or similar mechanisms to a remote server for further processing. In this preferred mode, the following CAT commands are used to send and receive data:

OPEN CHANNEL;
SEND/RECEIVE DATA; and
CLOSE CHANNEL.

The platform server 207 can use SMS, CAT_TP and HTTPS for remote OTA communication with the dSIM applets residing in the eUICC. To support this communication, the eUICC may support SMS and either CAT_TP or HTTPS or both. In some implementations, where CAT_TP and HTTPS are used, the platform server 207 and eUICC/iUICC may support DNS resolution to resolve the IP address of the platform server 207. Otherwise, the applets are pre-configured with the platform server's IP address.

The platform server 207 may determine the most relevant protocol according to the eUICC and Device capabilities. It is noted that the usage of SMS for OTA is recommended when exchanged commands between the platform server 207 and the eUICC can fit into a few SMS; such a solution can be more efficiently handled via SMS, as compared to HTTPS.

PoC and PoQ Operations

In order to participate and add value to the blockchain it integrates with, the platform server 207 introduces a novel consensus mechanism referred to as Proof-of-Service. It essentially consists of performing an improved Proof-of-Coverage (as described in FIGS. 5A and 5B) mechanism and then enhancing it with a Proof-of-Quality (as described in FIGS. 6A and 6B) mechanism.

The PCA is involved in the Proof-of-Coverage (PoC) mechanism while the QSA is involved in the Proof-of-Quality (PoQ) mechanism.

Figure 5A:
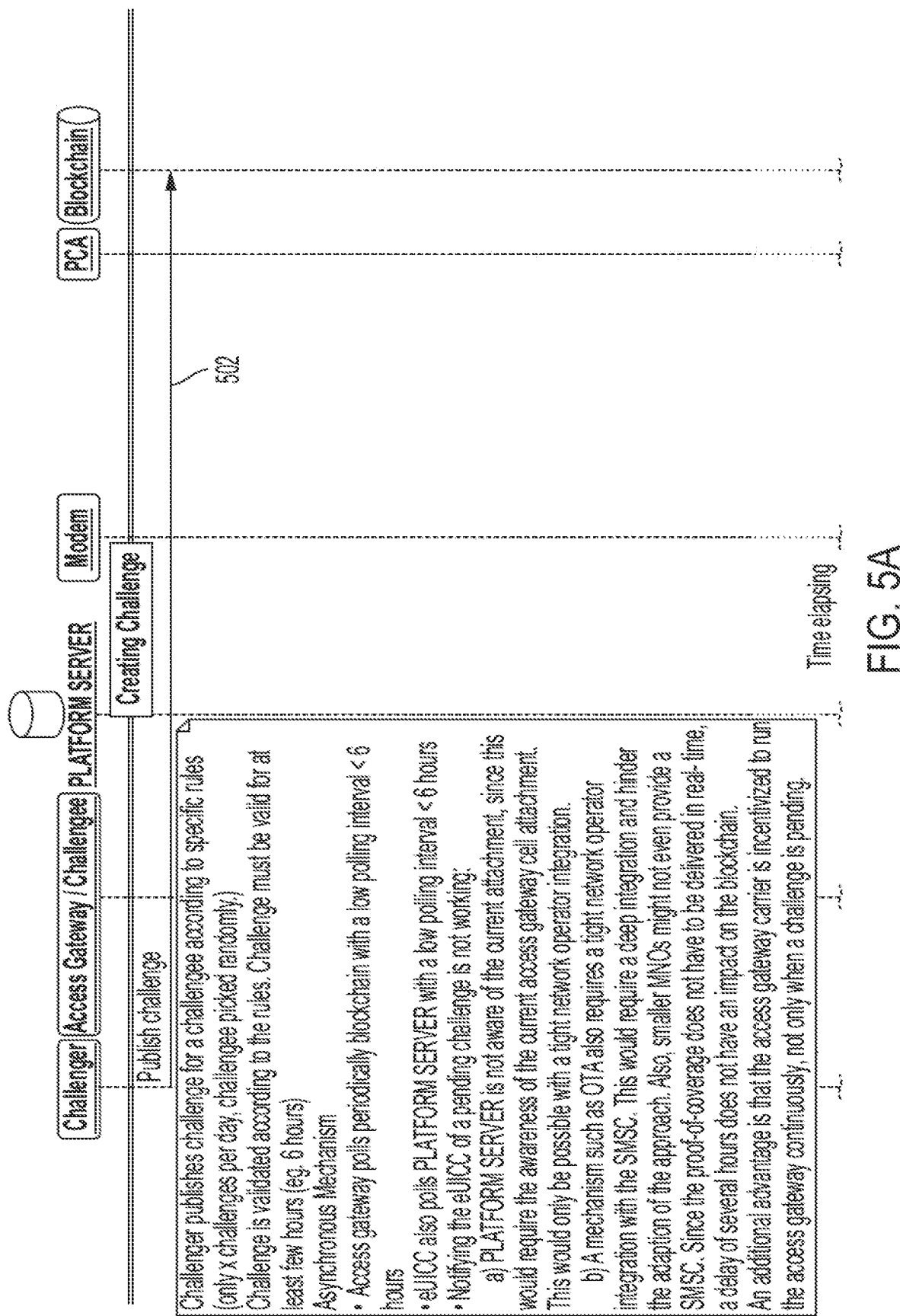
FIG. 5A illustrates an example Proof-of-Coverage method using an eUICC/iUICC that may be leveraged in example embodiments described herein.
Figure 5A:
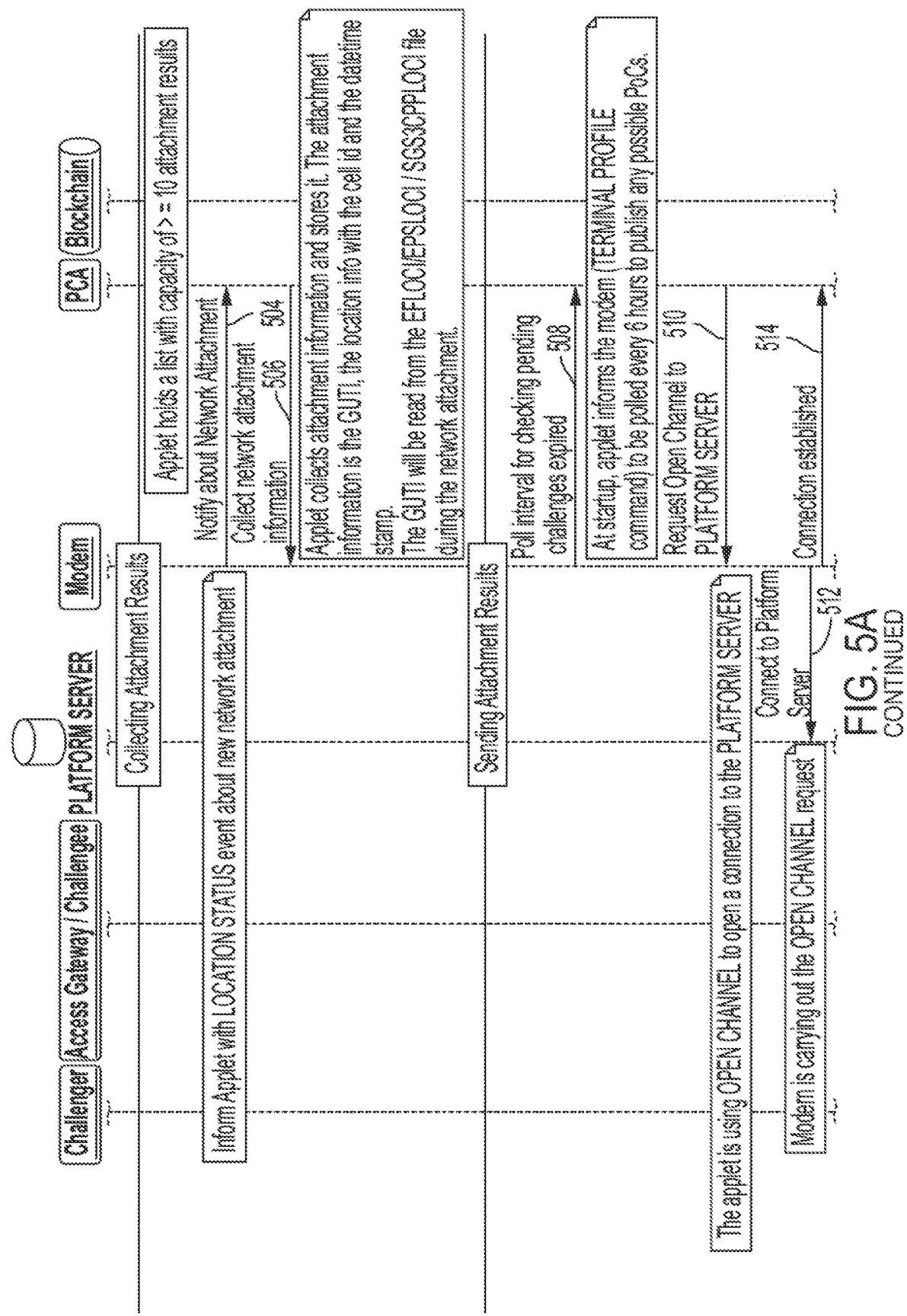
Figure 5A:
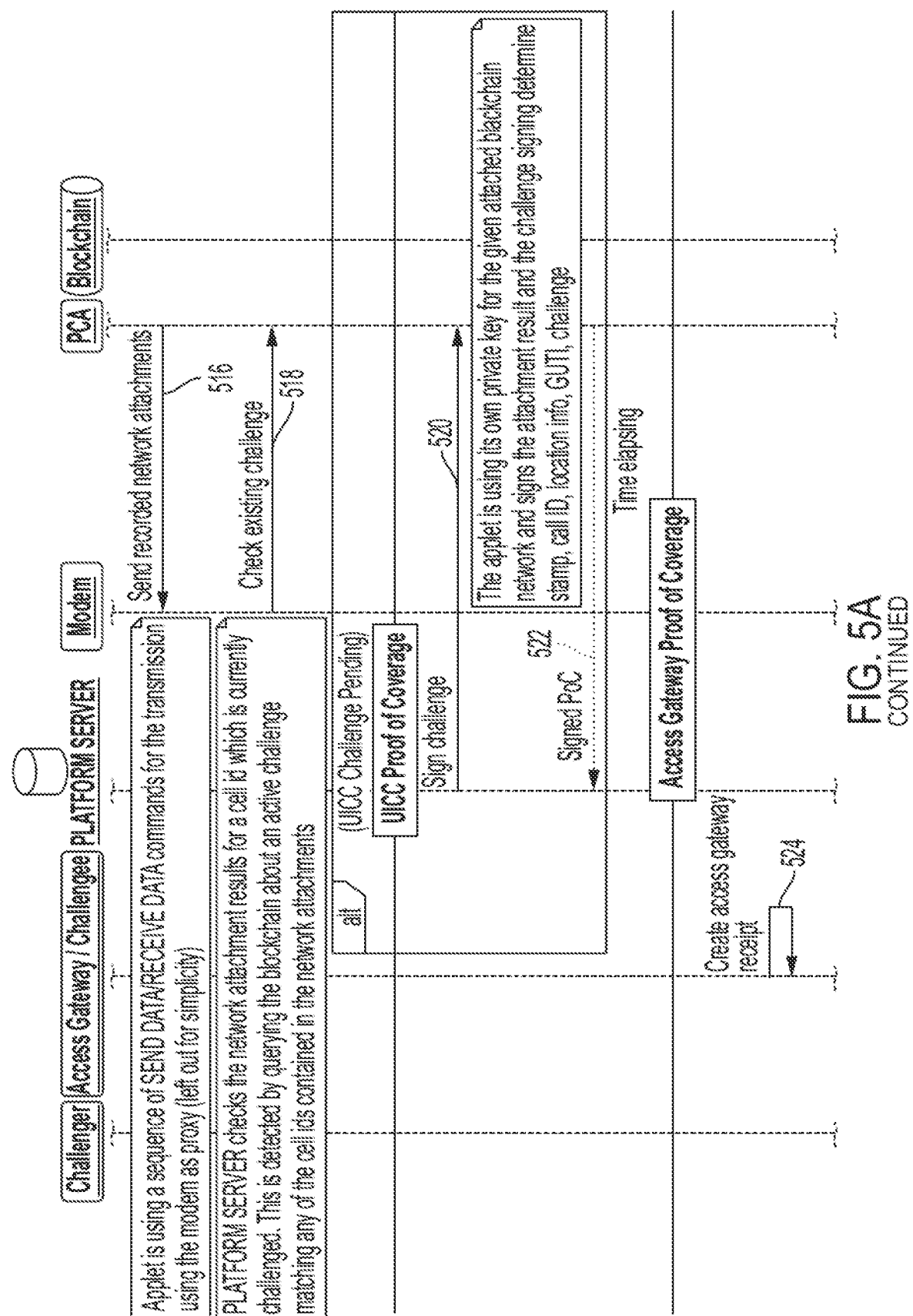
Figure 5A:
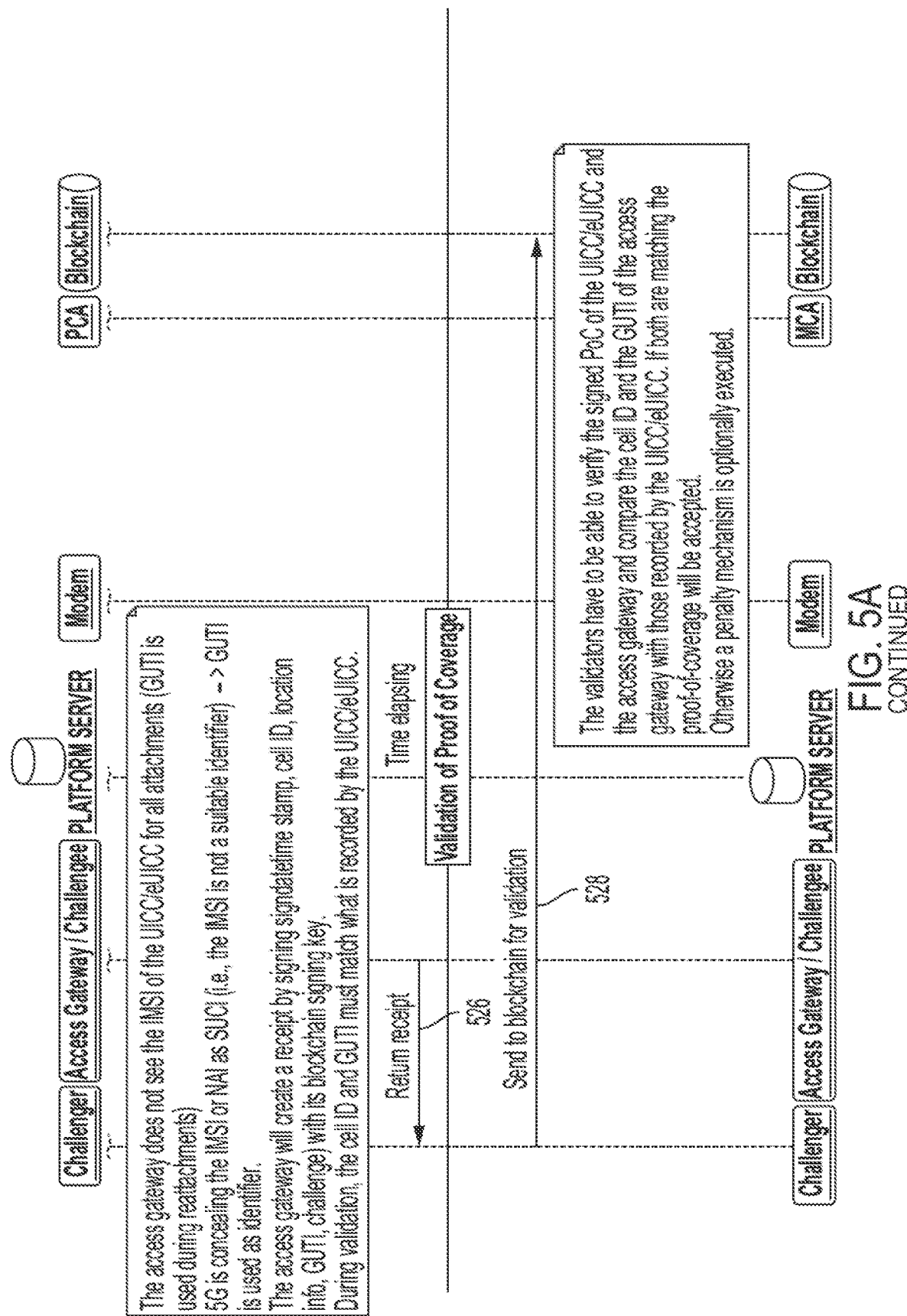

FIG. 5A shows a sequence diagram illustrating example operations performed by various devices depicted in FIG. 2 to implement an example Proof-of-Coverage mechanism as described herein. Operations performed by a challenger (which may comprise a platform server, access gateway, or other third party) are shown along the line extending from the box labeled "Challenger," operations performed by an access gateway (i.e., the recipient of a challenge, i.e., the "challengee") are shown along the line extending from the box labeled "Access Gateway/Challengee," operations performed by a platform server are shown along the line extending from the box labeled "Platform Server," operations performed by a modem of a subscriber equipment are shown along the line extending from the box labeled "Modem," and the operations performed by a PCA of the subscriber equipment are shown along the line extending from the box labeled "PCA." Operations impacting multiple devices, such as data transmissions between the devices, are shown using arrows extending between these lines. Generally, these operations are ordered temporally with respect to one another. However, it will be appreciated that the operations may be performed in other orders from those illustrated in FIG. 5A.

The first part of the Proof-of-Coverage methodology involves creating and issuing challenges. At operation 502, the PoC procedure begins with a challenger publishing a challenge for a particular challengee to a blockchain. There may be particular rules for the challenge, such as a limit on the number of challenges that may be published, the manner by which the challengee is selected (i.e., randomly, in some predefined sequence, etc.). The challenge is validated according to the rules, and the challenge must remain valid for a certain period (e.g., 6 hours). In an asynchronous implementation, the access gateway may periodically poll the blockchain (e.g., with a low polling interval of, such as, for instance 6 or fewer hours). Similarly, the eUICC of the subscriber equipment may also periodically poll the platform server (e.g., with a low polling interval). It will be appreciated that notification of the eUICC of a pending challenge may not always work. In one example, the platform server may not be aware of the current attachment of the eUICC, since awareness would require awareness of the current access gateway cell attachment, and that would only be possible with a tight network operator integration that may not exist in a distributed cellular network environment. In another example, a mechanism such as OTA also requires a tight network operator integration with the Short Message Service Center (SMSC), which would require a deep integration and hinder the adoption of this approach. In addition, smaller MNOs might not even provide a SMSC. However, because the Proof-of-Coverage does not have to be delivered in real-time, a delay of several hours does not have an impact on the blockchain. An additional advantage is that the access gateway carrier is incentivized to run the access gateway continuously, not only when a challenge is pending.

The second part of the Proof-of-Coverage methodology involves collecting attachment results once the subscriber equipment is aware of a challenge. At operation 504, the modem may notify the PCA of a network attachment, and the PCA may respond at operation 506 to collect network attachment information. The PCA applet may collect this attachment information and store it. The attachment information may, for instance, comprise a GUTI, which comprises the location information associated with a cell ID and a date/time stamp. The GUTI may be read from the EFLOCI, EFEPSLOCI and/or, the EF5GS3GPPLOCI during network attachment.

The third part of the Proof-of-Coverage methodology involves circulation of attachment results. At operation 508, the modem may determine that a poll interval for checking pending challenges has expired and may indicate this fact to the PCA. In this regard, the PCA may have previously informed the modem at startup of a poll interval for publishing any possible Proof-of-Coverage challenges (e.g., via a TERMINAL PROFILE command). At operation 510, the PCA may send an OPEN CHANNEL command to the modem to open a secure connection with the Platform Server. At operation 512, the modem carries out the OPEN CHANNEL command and at operation 514 sends a message to the PCA to confirm that the connection is established. At operation 516, the PCA thereafter transmits its recorded network attachments to the platform server. To do this, the QSA initiates a series of SEND DATA/RECEIVE DATA commands using the modem as a proxy. At operation 518, the platform server may check the network attachment results for a cell ID which is currently challenged. The platform server may detect these items by querying the blockchain about an active challenge matching any of the cell IDs contained in the network attachments received by the platform server from a PCA.

The fourth part of the Proof-of-Coverage methodology involves UICC Proof of Coverage. At operation 520, the platform server may sign a challenge and transmit it to the PCA. The PCA applet may use its own private key for the given attached blockchain network and sign the attachment results and the challenge sign (e.g., date/time stamp, cell ID, location information, GUTI, challenge). At operation 522, the PCA may return the signed PoC information to the platform server.

The fifth part of the Proof-of-Coverage methodology involves access gateway Proof of Coverage. At operation 524, the access gateway creates an access gateway receipt. In this regard, the access gateway does not see the IMSI of the UICC/eUICC for all attachments (this is because the GUTI is used instead). In 5G implementations, the IMSI or NAI are concealed as a SUCI (i.e., the IMSI is not a usable identifier), so the GUTI is used as an identifier. The access gateway may create the receipt by digitally signing, with its blockchain signing key, a package of information including the date/time stamp, cell ID, location info, GUTI, and challenge information. The cell ID and GUTI must match the cell ID and GUTI recorded by the UICC/eUICC during the validation phase. The access gateway then transmits the receipt to the challenger at operation 526.

The sixth part of the Proof-of-Coverage methodology involves validation of the Proof-of-Coverage. At step 528, the challenger sends a request to the blockchain for validation of the receipt. The validators associated with the blockchain have to be able to verify the signed PoC of the UICC/eUICC and the access gateway by comparing the cell ID and the GUTI of the access gateway with the one recorded by the UICC/eUICC. If there is a match, then the Proof-of-Coverage will be accepted. Otherwise, a penalty mechanism may optionally be executed. In this fashion, the network measurements are auditable by third party validators.

Figure 5B:
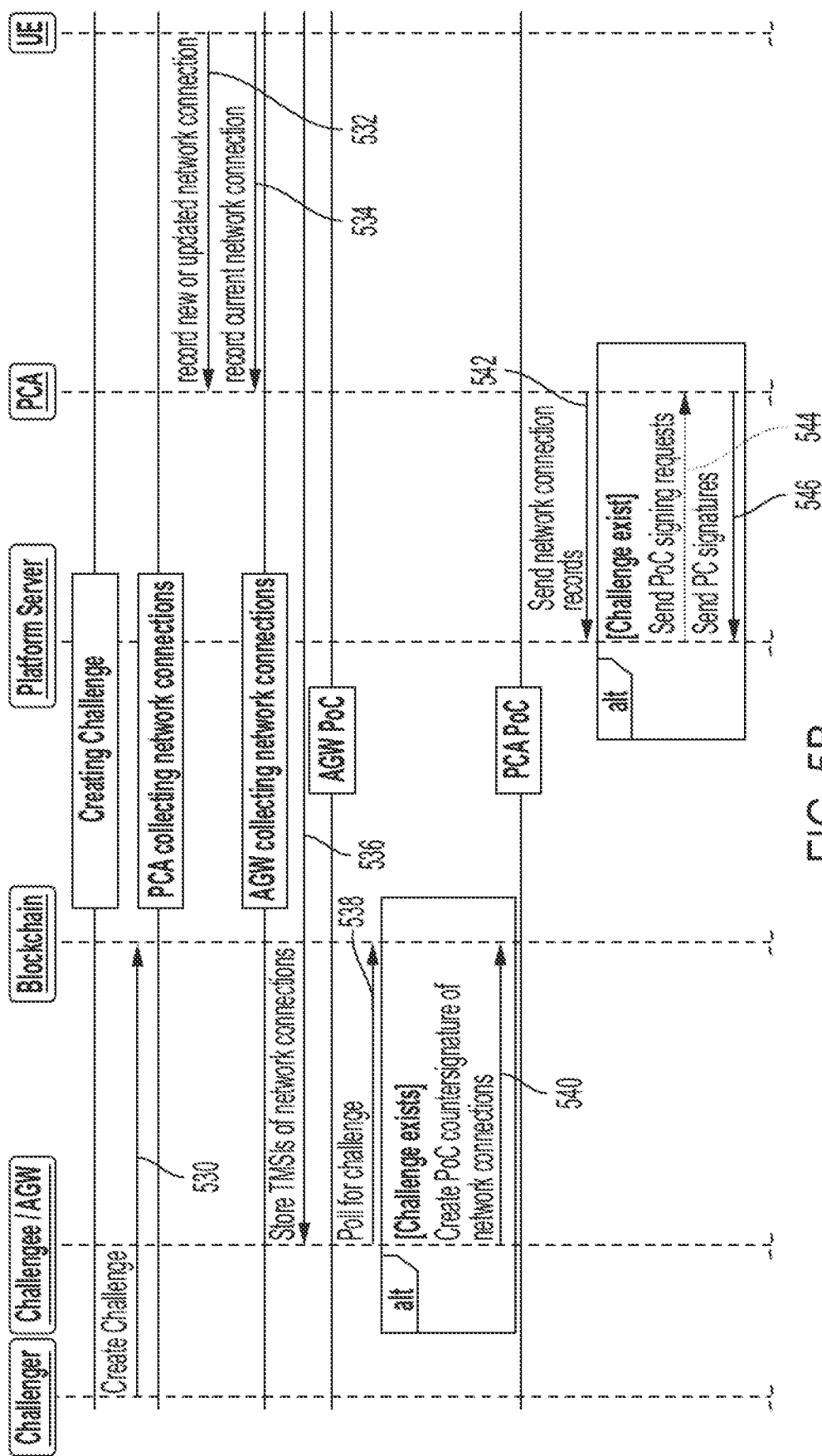
FIG. 5B illustrates another sequence diagram of an example Proof-of-Coverage method that may be leveraged in example embodiments described herein.
Figure 5B:
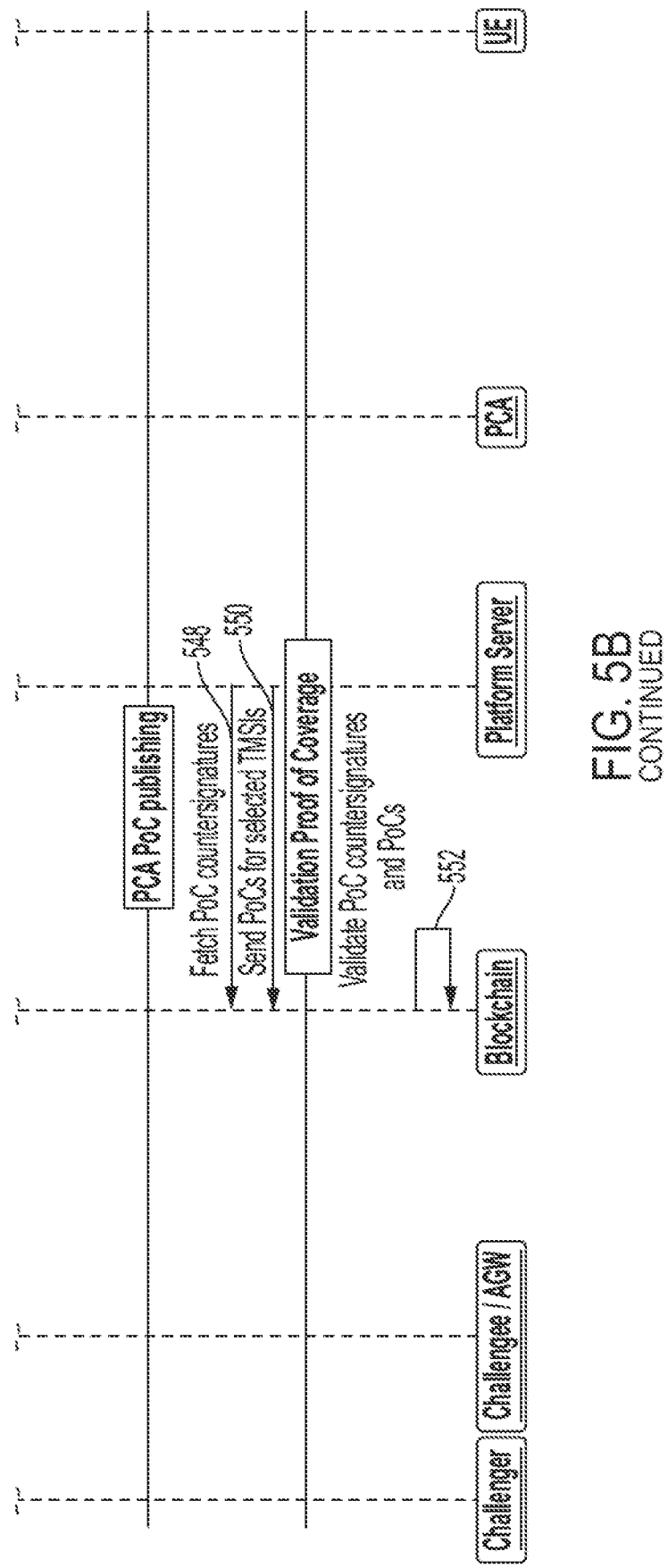

FIG. 5B shows a streamlined sequence diagram illustrating various example operations performed to implement the Proof-of-Coverage mechanism. The operations performed by the subscriber equipment are shown along the line extending from the box labeled "UE," the operations performed by a PSA of the subscriber equipment are shown along the line extending from the box labeled "PSA," the operations performed by a platform server are shown along the line extending from the box labeled "Platform Server," the operations performed by a blockchain are shown along the line extending from the box labeled "Blockchain," the operations performed by a challengee/access gateway are shown along the line extending from the box labeled "Challengee/AGW," and finally the operations performed by a challenger are shown along the line extending from the box labeled "Challenger." Operations impacting multiple devices, such as data transmissions between the devices, are shown using arrows extending between these lines. Generally, these operations are ordered temporally with respect to one another. However, it will be appreciated that the operations may be performed in other orders from those illustrated in FIG. 5B.

As shown by operation 530 of FIG. 5B, a challenger is creating a challenge for a specific challengee/AGW and publishes this challenge in the blockchain. A challenger can be a dedicated component or part of a different network component. The challenge for an AGW is created according to specific rules. These rules should restrict the challenger to publish only a limited number of challenges in a given timeframe, to create truly random challenges, and to select challengees in a fair and deterministic fashion. These rules shall be checked and enforced by the blockchain.

The challenger includes the cell identifier (CI) of the AGW in the challenge. The challenges will be scanned asynchronously by a platform server and should be valid for a certain time window, e.g., 6 hours. The selected time window should allow AGWs within areas with a low network connection count and UICCs in low power devices (e.g., IoT devices using eDRX and PSM not permanently connected to a network) to participate in the PoC. Having evaluations that may occur during a longer time window (e.g., rather than a point-in-time evaluation) also incentivizes participating AGWs to maintain consistent network performance over time.

As noted elsewhere herein, the PCA is installed inside an UICC of the UE. The UE is composed of a modem, a mobile device and the UICC. The PCA uses the card application toolkit (CAT) of the UE to collect network connections, connect to a platform server and send PoCs as witness using a secure channel. The PCA creates an asymmetric key pair (e.g., an ECC key pair created using the curve secp256r1), the public key of which is published to the blockchain during the PCA personalization. The key pair consists of the public key PbK_PCA and the private key PrK_PCA. The PrK_PCA stays secret and never leaves the PCA.

If a new or updated network connection is detected by the PCA (operation 532) or a given period has elapsed (operation 534), the PCA will record the current network connection. The data of the network connection include a counter, the Globally Unique Temporary UE Identity (GUTI) including the TMSI, the CI and the datetime. The GUTI is used as an identifier of the PoC, since it is both known at the AGW and the PCA and acts a pseudonym not revealing the identity of the UICC. Since the TMSI is part of the GUTI and must be identical between the PCA and AGW, the PCA and AGW are preventing each other from the manipulation of PoCs.

As shown by operation 536, the AGW stores all TMSIs of network connections by UEs within a time window matching validity of the challenge.

Like the PCA, the AGW has created an asymmetric key pair (e.g., an ECC key pair created using the curve secp256r1), the public key of which is published to the blockchain during the AGW personalization. The key pair consists of the public key PbK_AGW and the private key PrK_AGW. The PrK_PCA stays secret and never leaves the AGW.

At operation 538, the AGW polls the blockchain periodically for a challenge targeting it. The poll interval should be less than the validity of the challenge. When a challenge is found and the validity of the challenge has elapsed the AGW selects a subset of the stored TMSIs of network connections.

The subset should be selected by fair and deterministic rules. These rules may be checked and enforced by the blockchain. The selected TMSI of network connections are enriched by the PLMN and MME/AMF information known to the AGW to assemble the GUTI.

As shown by operation 540, the AGW creates a PoC countersignature by signing datetime, CI, GUTI and the challenge with PrK_AGW. The AGW sends the PoC countersignature to the blockchain.

The technology of mobile networks does not allow a direct interaction of the AGW with UICCs since the radio interface between the UE and the AGW does not define a usable protocol message or allow to open a channel from the AGW. Also due to limited resources and functions, the PCA cannot communicate directly with the blockchain. Hence, the platform server has to provide challenges to the PCA.

As shown at operation 542, the PCA opens a channel to the platform server and sends any not already sent network connections record to the platform server as soon as a network connection is available using a secure channel. The platform server queries the blockchain for all CIs in the received network connection record for unexpired challenges. If the platform server finds a challenge for one or several of the CIs, then at operation 544 the platform server sends a PoC signing request to the PCA including the challenge and the record counter for each found challenge. At operation 546, the PCA generates a signature using PrK_PCA for each requested PoC and sends the PoCs using a secure channel to the platform server. The platform server validates the CI and challenge and the signature with the PrK_PCA stored in the blockchain. The PoCs are stored in the platform server.

After the challenge has expired, at operation 548 the platform server queries the blockchain to fetch all PoC countersignatures of the AGW matching any challenges and GUTIs of stored PoCs in the platform server. If matching PoCs are found, at operation 550 the platform server sends the corresponding PoC(s) to the blockchain.

At operation 552, the blockchain validates the signatures of the PoC countersignatures and the PoCs with the corresponding PbKs stored in the blockchain. The blockchain validates the CI and the GUTI by checking for equality. If the validation fails, the blockchain enforces a penalty mechanism. If the validation succeeds, the blockchain invokes a reward mechanism.

Figure 6A:
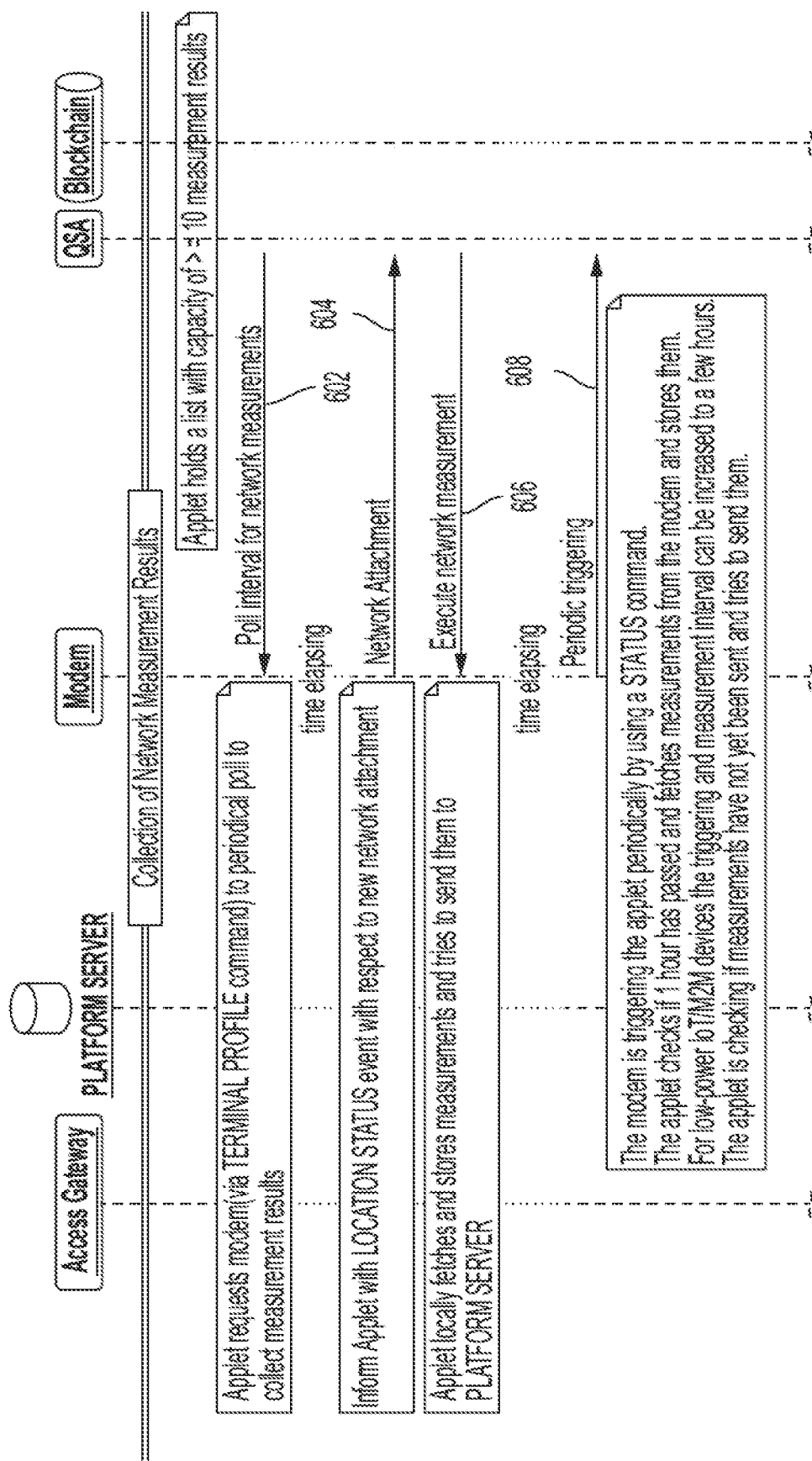
FIG. 6A illustrates a sequence diagram of an example Proof-of-Quality method using an eUICC/iUICC that may be leveraged in example embodiments described herein.
Figure 6A:
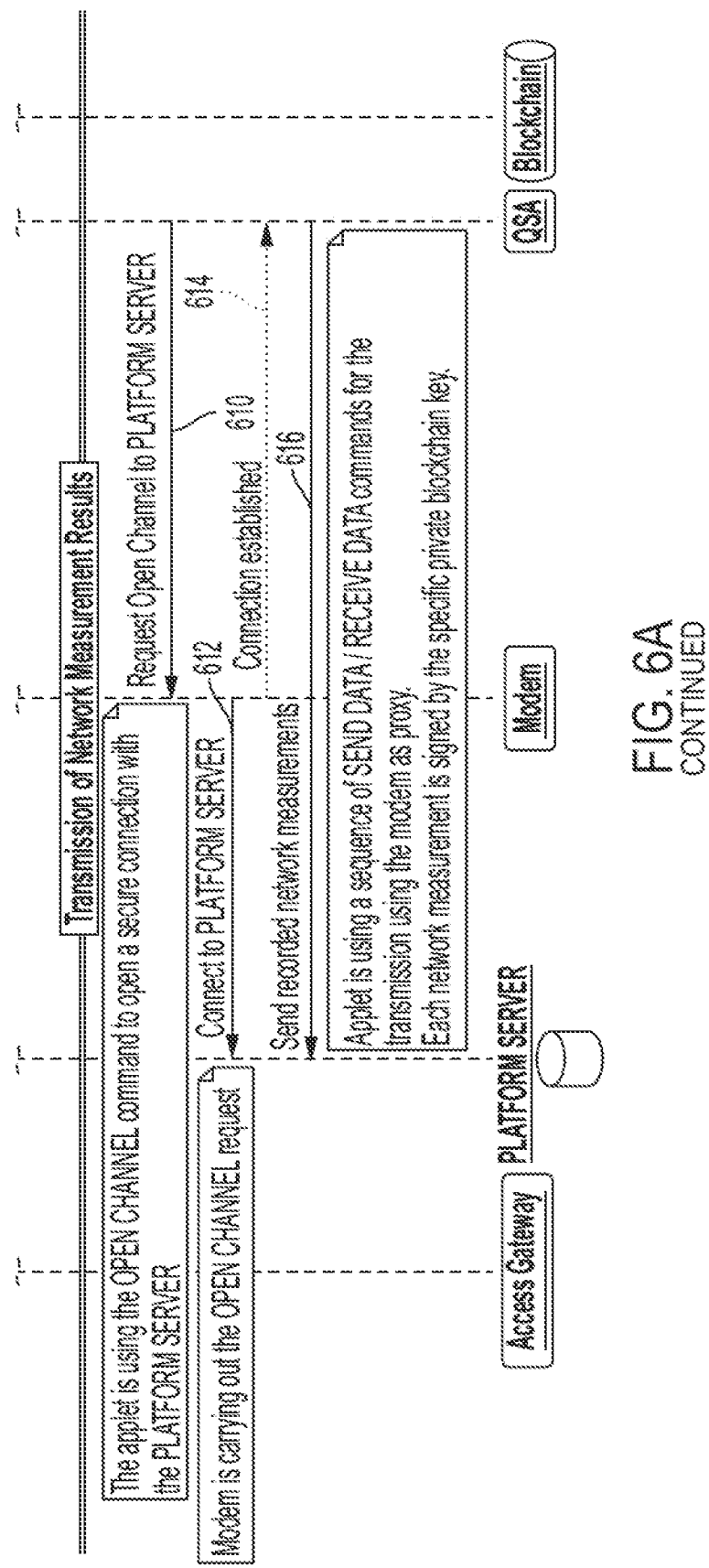

FIG. 6A shows a sequence diagram illustrating example operations performed by various devices depicted in FIG. 2 to implement the Proof-of-Quality mechanism. The operations performed by a modem of a subscriber equipment are shown along the line extending from the box labeled "modem," and the operations performed by a QSA of the subscriber equipment are shown along the line extending from the box labeled "QSA." Operations impacting multiple devices, such as data transmissions between the devices, are shown using arrows extending between these lines. Generally, these operations are ordered temporally with respect to one another. However, it will be appreciated that the operations may be performed in other orders from those illustrated in FIG. 6A.

The first part of the PoQ protocol involves the collection of network measurement results. At operation 602, the QSA sends a TERMINAL PROFILE command to the modem to request a periodic poll to collect measurement results. As shown by operation 604, after some elapsed period of time, the modem may inform the QSA applet, using a LOCATION STATUS event, if there is a new network attachment, which in turn may prompt execution of operation 606, in which the QSA executes a network measurement operation, by locally fetching and storing measurement results. The QSA may, in some implementations, have sufficient capacity to hold 10 or more measurement results. However, even without a new network attachment, if the poll interval is reached (i.e., expires), at operation 608 the modem may trigger the QSA to execute a network measurement to capture network measurements. The modem may trigger the QSA applet to perform the network measurement using a STATUS command. In this regard, the QSA may confirm whether the poll period has elapsed and, if so, may fetch the measurements from the modem and store them locally. It will be understood that certain devices, such as low-power Internet-of-Things (IoT) or Machine-to-Machine (M2M) devices may operate on a much longer poll period to preserve resources.

The second part of the PoQ protocol involves the transmission of the network measurement results to the platform server. In operation 610, the QSA sends an OPEN CHANNEL command to the modem to open a secure connection with the Platform Server. At operation 612, the modem carries out the OPEN CHANNEL command and at operation 614 sends a message to the QSA to confirm that the connection is established. At operation 616, the QSA thereafter transmits its recorded network measurements to the platform server. To do this, the QSA initiates a series of SEND DATA/RECEIVE DATA commands using the modem as a proxy. Each network measurement may be signed by the specific private blockchain key held by the QSA.

Figure 6B:
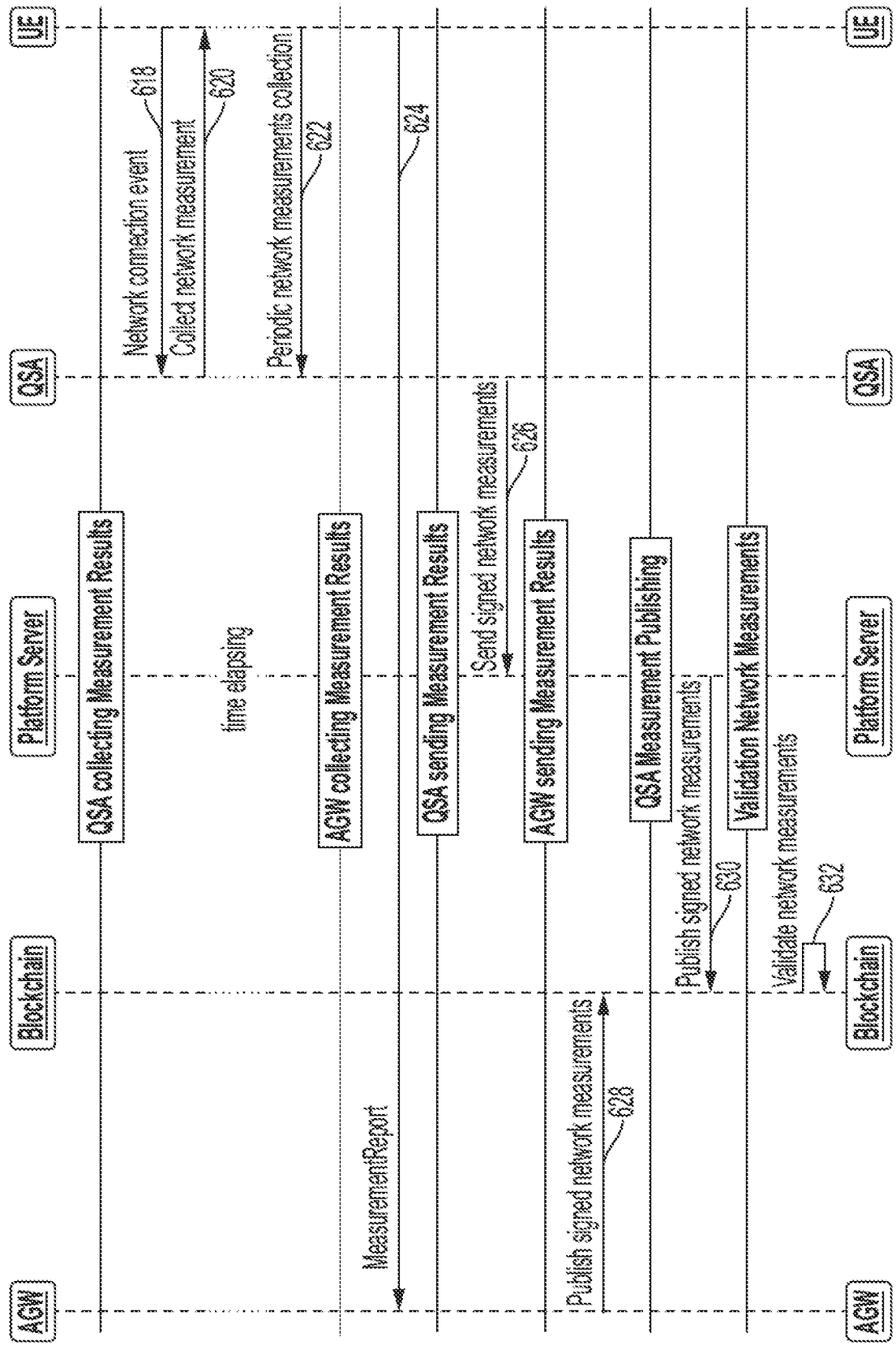
FIG. 6B illustrates another sequence diagram of an example Proof-of-Quality method that may be leveraged in example embodiments described herein.

FIG. 6B shows a streamlined sequence diagram illustrating various example operations performed to implement the Proof-of-Quality mechanism. The operations performed by the subscriber equipment are shown along the line extending from the box labeled "UE," the operations performed by a QSA of the subscriber equipment are shown along the line extending from the box labeled "QSA," the operations performed by a platform server are shown along the line extending from the box labeled "Platform Server," the operations performed by a blockchain are shown along the line extending from the box labeled "Blockchain," and finally the operations performed by an access gateway are shown along the line extending from the box labeled "AGW." Operations impacting multiple devices, such as data transmissions between the devices, are shown using arrows extending between these lines. Generally, these operations are ordered temporally with respect to one another. However, it will be appreciated that the operations may be performed in other orders from those illustrated in FIG. 6B.

As noted previously, the QSA is installed inside an UICC of the UE. The QSA uses the card application toolkit (CAT) of the UE to collect network measurements (NM), connect to a platform server and send NMs using a secure channel. The QSA creates an asymmetric key pair (e.g., an ECC key pair using the curve secp256r1), the public key of which is published to the blockchain during the QSA personalization. The key pair consists of the public key PbK_QSA and the private key PrK_QSA. The PrK_QSA stays secret and never leaves the QSA.

If a new or updated network connection is detected by the QSA or a given period has elapsed, e.g., 1 hour, the QSA will take a NM (see operations 618, 620, and 622). The data of the NM include a counter, the Globally Unique Temporary UE Identity (GUTI) including the TMSI, the cell identifier (CI), the signal quality (e.g., RSRP, RSRQ and SINR), the access technology (e.g., 5G, LTE, 2G), the timing advance (relative distance to cell), the geolocation, and the datetime.

The GUTI is used as an identifier of the NM, since it is known both at the AGW and the QSA, and therefore acts a pseudonym not revealing the identity of the UICC and can be used to match NMS at the platform server level and the validator with the datetime and the CI.

To prevent a malicious UE from sending fake NMs, the AGW is used as a witness to countersign NMs. As shown at operation 624, the UE sends MeasurementReports to the AGW (e.g., as defined by the LTE/5G specifications) periodically to enable the AGW to select a better network cell. The AGW stores all measurements including the TMSI of the UEs for a specific time window.

At operation 626, the QSA opens a channel to the platform server and sends any not already sent NMs to the platform server as soon as a network connection is available using a secure channel. The QSA generates a signature using PrK_QSA for each NM before sending the NMs. The platform server validates the signature with the PrK_QSA stored in the blockchain. The NMs are stored in the platform server.

Like the QSA, the AGW creates an asymmetric key pair (e.g., an ECC key pair created using the curve secp256r1), the public key of which is published to the blockchain during the AGW personalization. The key pair consists of the public key PbK_AGW and the private key PrK_AGW. The PrK_PCA stays secret and never leaves the AGW.

At operation 628, the AGW selects a subset of the stored NMs after a certain period, e.g., 1 hour. The subset may be selected by fair and deterministic rules that may be checked and enforced by the blockchain. The selected TMSI of network connections are enriched by the PLMN and MME/AMF information known to the AGW to assemble the GUTI. The AGW creates a NM countersignature by signing the NM with PrK_AGW. The AGW sends the QSA countersignature to the blockchain.

As shown by operation 630, the platform server queries the blockchain for published NMs by AGW matching the CI, GUTI and datetime of stored NMs. If matching NMs are found, the platform server sends the NMs signed by the QSA to the blockchain.

Finally, as shown by operation 632, the blockchain validates the signatures of the NM countersignatures and the NMs of QSAs with the corresponding PbKs stored in the blockchain. The blockchain validates the CI, the GUTI and the datetime range for a match. The platform server checks if the NMs have matching signal quality and the access technology is the same. If all checks pass, the NM is accepted and will be used for computing a score for the AGW based on the signal quality and the timing advance.

The platform server 207 shall be identified as an approved service provider by the associated blockchains. It is envisioned that there can be multiple approved service providers. The approval should be done by a PKI tree structure generating an intermediate certification authority for a service provider signed by the root certification authority of a given blockchain. All requests to update the blockchain from the service provider are checked by the validation nodes of the given blockchain and will only be accepted when a digital signature is included proving the authenticity of the service provider.

A PKI certificate stored in the blockchain enables a trustless decentralized service while honoring basic security requirements such as Availability, Integrity and Confidentiality.

The platform server 207 acts as a Certificate Authority (CA) responsible for:
Issuing compliant Applet Certificates;
Secure delivery of Certificates to subscriber equipment 206;
Revocation of Applet Certificates;
Generation, protection, operation, and destruction of CA private keys;
Certificate lifecycle management ensures to ensure that all aspects of the CA services, operations, and infrastructure related to issued certificates are performed in accordance with blockchain-specific requirements, representations, and warranties; and/or
Confirmation of the binding between a public key and the identity of the "Subject" of the Certificate.

The platform server 207 will utilize the list of ICCIDs to generate tokens for the ICCIDs. There are two kinds of registration tokens:
1. eUICC/iUICC registration tokens—These are used by the UICC to prove the personalization and may also be referred to as personalization tokens; and
2. eUICC/iUICC ownership tokens—These are used by the owner of the eUICC/iUICC to prove the ownership of the UICC.

The eUICCs/iUICCs must be prepared by installing the applets and personalizing with the registration tokens as identity proofs. In the preferred mode, eUICCs/iUICCs are remotely personalized by using the CONVERGED SUBSCRIPTION MANAGER to install the dSIM profiles. To facilitate this installation, the legacy eUICCs' downloadable profile package is extended by including the QSA and the registration tokens.

There are two types of PoC Cryptographic modes:
Asymmetric PoC Cryptographic Mode: The asymmetric cryptographic mode allows third parties to directly verify signatures for PoCs created by the PCA and stored within the blockchain; and
Symmetric PoC Cryptographic Mode: The symmetric cryptographic mode does not allow the PCA to create signatures for PoCs which can be stored in the blockchain and verified by third parties. Rather, the platform server 207 will generate a blockchain ECC key pair for the applet and act on behalf of the applet when signing PoCs. The hash of the public blockchain key will be used as a unique identifier of the applet in the blockchain. The applet will not create any blockchain keys in this mode.

The PCA or QSA can connect to the platform server 207 by using an OPEN CHANNEL command and can submit data to it using the SEND DATA command to transmit the personalization request using as data the EF ICCID, the eUICC registration token and the generated public blockchain key used for the PoC. The applet will use the personalization key to generate a Message Authentication Code (MAC) over the personalization request. In case the asymmetric PoC cryptographic mode is used the applet will create a signature sign (datetime, ICCID, UICC registration token, eUICC public blockchain key) using the private blockchain key and attach it to the personalization request data and the MAC, otherwise the personalization request data and the MAC will be sent.

If the subscriber equipment 206 has no user interface the platform server 207 will provide a UI for the registration, otherwise the subscriber agent can be utilized.

The dSIM profile owner (i.e., the offloading operator) has to provide the ICCID and profile ownership token and the crypto wallet address that will be linked to the dSIM profile. The data is checked by the platform server 207. If the applet has already carried out the personalization of the dSIM profile, registration data can be added to the blockchain, otherwise the platform server 207 will wait until the personalization is completed.

In terms of registration to a given blockchain, the platform server 207 may add the public key of the dSIM profile onto the blockchain inside a euicc_registration_transaction holding a signature sign (public blockchain key, crypto wallet address) using the private key of the platform server 207. The blockchain validation nodes will verify the signature of the platform server 207.

The eUICC/iUICC must support ECC secp256-r1 for this mode. The PCA will generate a blockchain ECC key pair. The private blockchain key will be kept inside the eUICC/iUICC and will never be exported. The hash of the public blockchain key will be used as unique identifier of the dSIM profile in the blockchain.

SYMMETRIC NETWORK ACCESS APPLICATION KEYS: In this mode of operation, the NAA is utilized for mobile network authentication (S6a). The NAA consists of a Java Card applet that is configured with standard keys (Ki, OPc). These keys are also stored securely in the platform server 207 (as well as the offloading operator network database). In this mode of operation, the offloading operator has a copy of the private authentication keys for the given dSIM profile and the system is still fairly centralized.

ASYMMETRIC NETWORK ACCESS APPLICATION KEYS: In this mode of operation, the DAA is utilized for mobile network authentication (S6a+). The DAA consists of a Java Card applet that has access to a PKI certificate stored by the PCA and also shared with the QSA. In this mode of operation, the offloading operator does not have a copy of the private authentication keys for the given dSIM profile, and the system is still fairly decentralized. The DAA is configured to enable mutual authentication of the subscriber equipment 206 with an offloading gateway using the private key stored in the file system of the UICC and a public key of the offloading gateway. The private key is used to sign a message that may be decrypted by the offloading gateway to verify authenticity of the subscriber equipment 206. Similarly, the public key of the offloading gateway may be used by the subscriber equipment 206 to verify a signature of a similar message received from the offloading gateway. The subscriber equipment 206 is thereafter configured to exchange messages with the offloading gateway via a mutually authenticated session. In order to support DAA, a baseband/modem is required to support asymmetric authentication. It is therefore recommended that the baseband/modem is required to replace functional calls to the MILENAGE algorithm function to a PKI algorithm (X.509 certificate) and route authentication sessions to the DAA instead of the NAA.

Decentralized Network Access Point Scoring and Incentives

Each blockchain-based carrier is given a score after each network access session. The computation of the score is as follows.

When the NAA is used for symmetric network authentication, a push message is sent to the QSA to perform network measurement reports (NMR) retrieval operations.

When the DAA is used for asymmetric network authentication, a push message is not required as the QSA shares a secure logical interface with the DAA inside the eUICC. The QSA is therefore notified to perform network measurement operations.

Whether the NAA or DAA is used, the QSA sends the NMRs to the platform server 207. The platform server 207 rates each NMR entry against a platform gold standard constant. The final rating of this network session is the weighted average of ratings of all NMR entries for this network session. The final rating is then stored in data storage nodes 209 of the platform server 207. The final rating is also added to the sum of all ratings for this network access point and an average rating is then computed to provide a current score for this network access point and how it stands against other network access points. From the web portals or mobile apps, information is displayed to authorized users in a graphical-user interface by visually overlaying them upon real-time map information. Overlaying scores and network measurement reports consist of displaying augmented-reality access point areas that can be expanded for further visualization and interaction. Images and additional information can therefore be valuable to help remotely examine issues and improve the quality of service.

If the rating is acceptable by the platform server 207 (or the blockchain used for this network session), the blockchain may send a reward to the access gateway's carrier in its blockchain's cryptocurrency. The reward is generally a percentage of its participating rewards in the proof-of-coverage mechanism. However, the platform server 207 may elect, at its discretion, to provide an additional reward based on a subscriber's data usage.

It is worth pointing out that acceptable ratings depend on the use case and policies (e.g., network slicing for smartphone and camera drone) and may be for instance at least a combination of a 4-BAR SIGNAL, FAST_SPEED, GOOD_LATENCY, etc.

During an attachment session from one access gateway for a given blockchain to another access gateway for another blockchain, the platform server 207 may orchestrate the handover in such a way that handover latency is minimal.

Interoperability is required to allow a subscriber equipment 206 to roam across a multitude of different blockchain-based mobile networks. For that purpose, an offloading operator is initially required to enter into agreements (preferably via smart contract) with all relevant decentralized mobile networks. A list of allowed IMSI blocks is therefore provisioned into these blockchain-based mobile network core elements (MME, HSS, etc.).

At handover from a source cell (e.g., AGW1/gNB1) to a target cell (e.g., AGW2/gNB2), there is a latency whereby the mobile terminal is not able transmit or receive user data. This mobility interruption time, referred to as handover latency, can be defined as the shortest time duration supported by a mobile network during handover. This parameter is a critical measurement of system performance. As per 3GPP 36.881, the handover latency can be measured by the time UE received handover command (RRC Connection Reconfiguration Incl. mobilityControlInfo) from the source cell and it sends RRC Connection Reconfiguration Complete to the target cell.

To achieve a good customer experience and adhere to specific SLAs for mission-critical low-latency applications, handover latency very close to zero milliseconds—a significant reduction on today's 30-60 millisecond handover in 4G LTE systems—is therefore required. Although 3GPP has provided solutions to make all the difference for 5G networks, the case for blockchain-based mobile networks used for offloading has not been specified.

It is therefore proposed that all neighboring blockchain-based mobile networks integrated with the platform server 207 are synchronized in real-time to accept handover.

In a 4G/LTE and 5G NSA context, this means that the offloading gateway acts as an intelligent orchestrator whereby its DEA/DRA sends messages to all neighboring MMEs to maintain session information. The GTP of the offloading gateway would also notify the neighboring SGWs to cache the subscriber's information so that the relay to its relevant PGW is frictionless. To achieve this, it is understood that the visited network must be updated so that the gNB-UE communication is seamless.

A GPRS Tunneling Protocol (GTP) proxy is used to establish a tunnel at the control plane level (GTP-C) and the user/data plane level (GPT-U). For the GTP-C, signaling between SGW and PGW is performed (e.g., ATTACH/DE-ATTACH), QoS parameters adjustment. For the GTP-U, user data is transported from the visited network to the home network.

Figure 8:
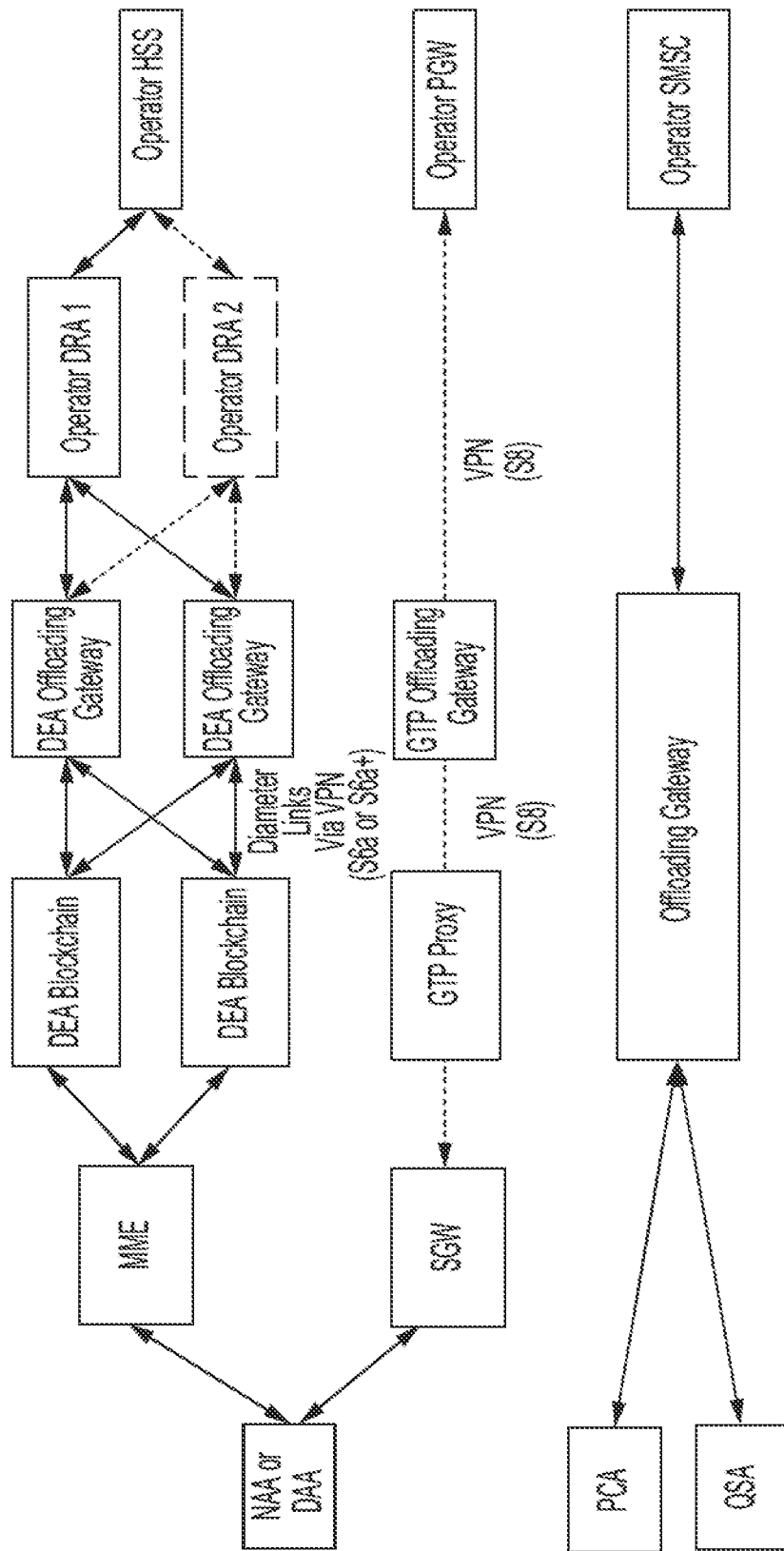
FIG. 8 illustrates an example integration between a blockchain and offloading operators in accordance with some example embodiments described herein.

In a 5G SA context, the platform server 207 also acts as an intelligent orchestrator and relevant network elements are synchronized similarly to 4G/LTE and 5G NSA modes. An illustration of the interactions described above is illustrated in FIG. 8.

Operations for facilitating network handoff are described in connection with FIG. 7

Figure 7:
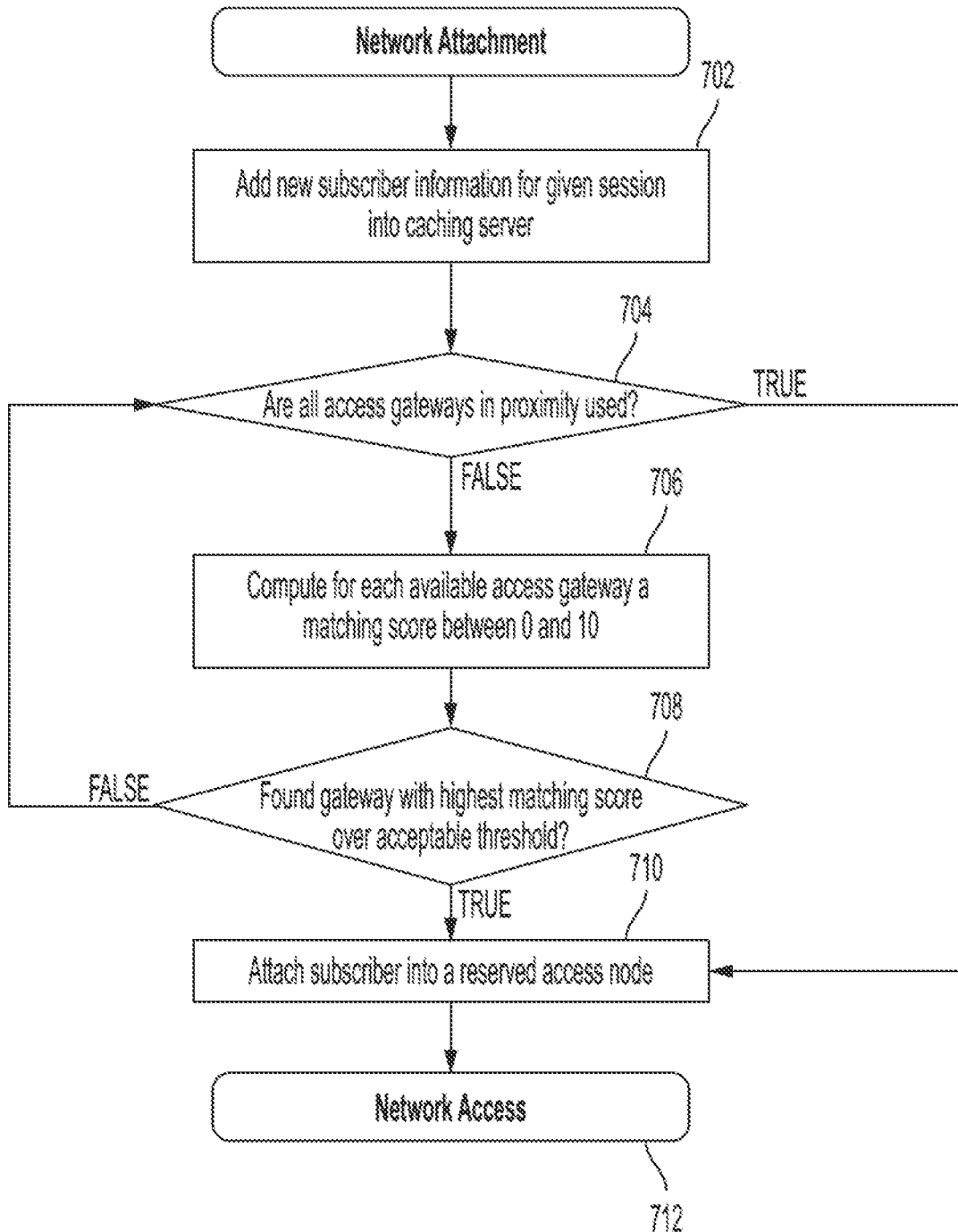
FIG. 7 illustrates an example scoring system that may be utilized to annotate visited network nodes in example embodiments described herein.

Turning to FIG. 7, a flowchart is illustrated that contains example operations implemented by a platform server 207 to facilitate network handoff for a particular subscriber equipment. As shown by operation 702, the platform server 207 may add new subscriber information for a given session into a caching server. The procedure then advances to operation 704, where the platform server 207 determines whether all access gateways in proximity to the subscriber equipment are being used. If so, then the procedure advances to operation 710. But if not, then the procedure advances to operation 706, in which the platform server 207 computes a matching score for the subscriber equipment for each of the available access gateways. The matching score may be generated based on QoS measurement data and PoC information regarding the available access gateways. From the QoS measurement data and PoC information, the platform server 207 may generate a single score indicative of the expected network integrity for the subscriber for each available access gateway. Following computation of the matching scores for the available access gateways, the procedure advances to operation 708, where the highest matching score is identified and compared to the subscriber equipment's minimum acceptable threshold for network attachment. If the matching score satisfies the threshold, then the procedure advances to operation 710. If not, then the procedure returns to operation 704 to identify available access gateways.

At operation 710, the subscriber equipment is attached to an access gateway, which is either the highest matching access gateway or a reserved access node in an instance in which no alternative access gateways are available. As shown by operation 712, the subscriber equipment may thereafter maintain network connectivity through the new network attachment. In this fashion, utilization PCA and QSA operations generates the network coverage and quality data that can thereafter be gathered by the subscriber equipment to enable the optimization of resource utilization and network selection from a plurality of decentralized cellular networks.

AI System Feedback

The platform server 207 uses machine learning algorithms, task completion heuristics and an artificial neural network to provide real-time critical information and commands to the subscriber agent as well as the PCA, QSA and optionally the DAA. It is envisioned that ultimately many of these features of the platform server 207 will migrate into the subscriber equipment 206, whereby the neural network will be local, and learning will be performed offline. It is also noted that learning can always be shared and propagated to other instances of the subscriber agent, PCA, QSA, and DAA directly via the server application or indirectly (i.e., peer-to-peer) using wireless communication (e.g., cellular, Wi-Fi, Bluetooth, etc.).

For the sake of clarity, an artificial neural network is defined herein as a network of simple nodes which receive input data from the client devices, change their internal states (using an activation function) according to the input data, and produce output data depending on the input data and the activation function. The interconnection typically results in a weighted graph model. The weights as well as the functions that compute the activation can be modified by a learning method.

The platform server 207 can utilize a set of widely available deep learning algorithms provided in tools such as Google's TensorFlow. The platform server 207 can also utilize a custom deep learning algorithm. In either case, these algorithms should utilize the dataset compiled by the platform server 207 to train its artificial neural network in order to automatically at least:

1. classify measurements (e.g., 1-BAR SIGNAL, 2-BAR SIGNAL, 3-BAR SIGNAL, 4-BAR SIGNAL, 5-BAR SIGNAL, FAST_SPEED, AVERAGE_SPEED, SLOW_SPEED, GOOD_LATENCY, AVERAGE_LATENCY, BAD_LATENCY); and
2. determine the solution for a given task (e.g., a set of actions to be taken by the subscriber equipment 206).

In one embodiment, the backend system of the platform server 207, which has access to the data storage system of tasks and measurements, may use a remote procedure call (RPC) client to communicate with Tensorflow's serving environment. The RPC client may be developed using an available open-source RPC system such as gPRC. It can also be further utilized to communicate with a proprietary serving environment.

In another embodiment, the backend system of the platform server 207 may be implemented using the Go language and may communicate directly with its own neural network implementation library also programmed in the Go language. In that embodiment, the external serving environment is not required.

One embodiment of this invention utilizes an artificial neural network to classify measurements, and in the process may, for instance, detect areas with connectivity concerns. For instance, an example of such an artificial neural network is a convolutional neural network, (e.g., ConvNet). A ConvNet is a type of feedforward artificial neural network, with multiple hidden layers, whereby the individual nodes are tiled in such a way that they respond to overlapping regions in the visual field. It is widely agreed that ConvNets are well suited for image or speech classification problems as they leverage the two-dimensional structure of images or other 2D input such as a speech signal. They are also known to perform best when they have highly interconnected layers. The ConvNet is employed by the platform server 207 when network measurement reports include images.

For the sake of clarity, a learning method for a given artificial neural network is defined as a rule which modifies the parameters of the artificial neural network, in order to produce for a given input data a favored, measurable output data. The learning process requires modifying the weights and thresholds of the variables within the artificial neural network. The backpropagation learning method may be implemented in an example-based sequential mode (whereby the error is computed by applying an instantaneous error formula such as a sum square error) or in an epoch-based batch mode (whereby the error is computed by applying an average squared error energy formula).

Figure 9:
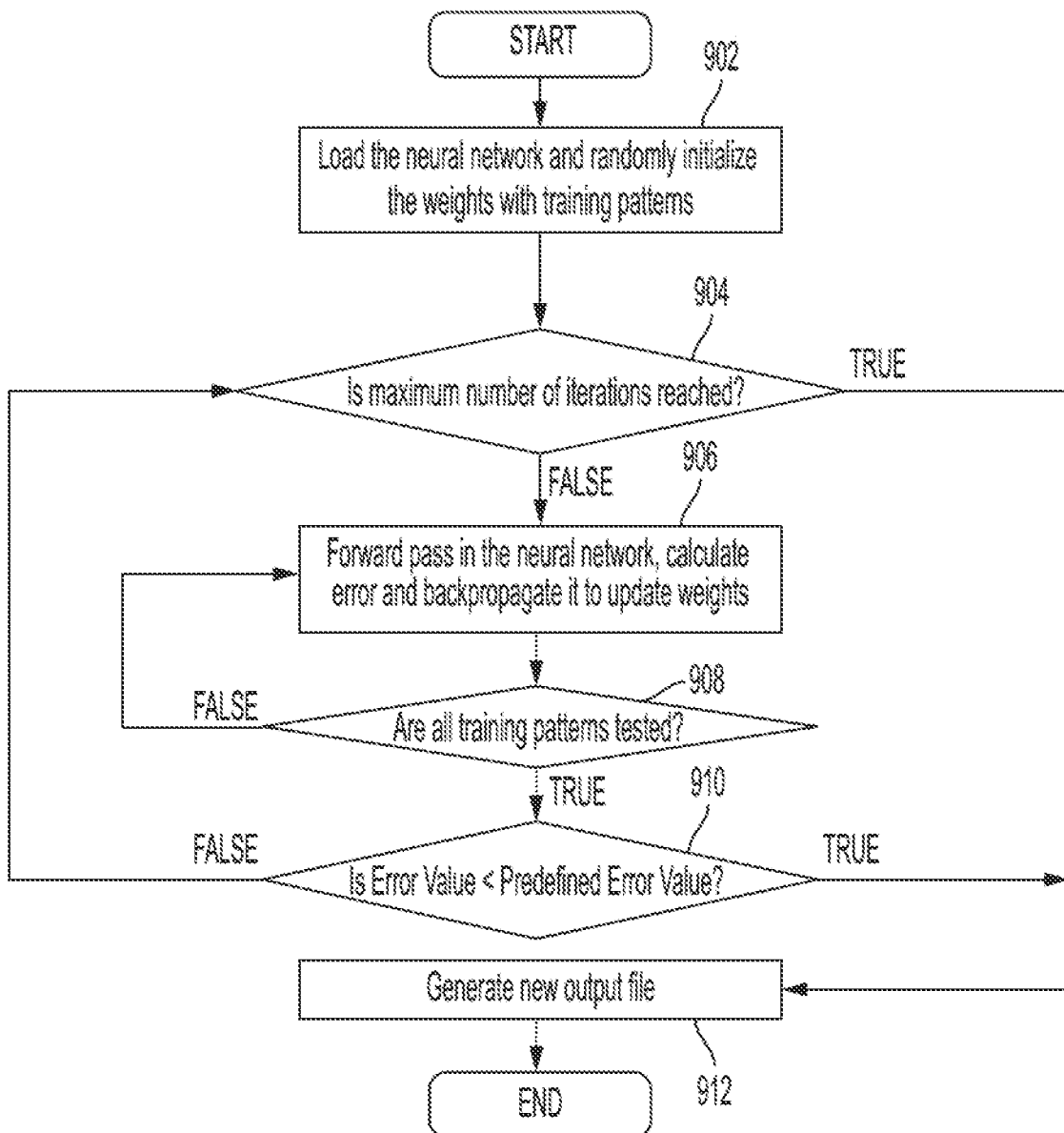
FIG. 9 illustrates operations of an example machine learning capability of a dSIM profile that may be leveraged in example embodiments described herein.

In some implementations, an example-based sequential mode may be used by the platform server 207, such as that illustrated in the flowchart of FIG. 9. The procedure may begin at step 902, where the platform server 207 loads the neural network. The neural network may be initialized with random weights, or it may be initialized in a predefined initial state. Following initialization, the procedure advances to step 904, which begins an iterative training cycle until the neural network is sufficiently accurate. At step 904, the platform server 207 evaluates whether the maximum number of iterations has been reached. If so, the procedure advances to step 912. Otherwise, however, the procedure moves to step 906. At step 906, the platform server 207 provides a training pattern to the neural network (i.e., a forward pass in the neural network), calculates error, and back-propagates information to update the weights of the neural network. At step 908, the platform server 207 determines if all training patterns have been tested. If not, then the procedure returns to step 906 for another training cycle. If so, then the procedure advances to step 910 for a determination of whether the accuracy of the neural network satisfies a predefined error value. If so, the procedure advances to step 912. If not, it returns to step 904 for another iteration. At step 912, the platform server 207 generates a new output file, which may be used by the platform server 207 to classify measurements received from various subscriber equipment.

As described above, the artificial neural network progressively learns a particular offloading task by considering examples collected from previous tasks completed by testers. For instance, the artificial neural network learns to identify measurements that contain connectivity area items by analyzing example maps that have been manually labeled and uses the results to identify connectivity areas based on the location of the subscriber equipment 206.

The neural network is trained using the large and unique dataset obtained from the client devices and its performance is observed by a specialized administrator until its generalization is satisfactory. The supervised learning of the artificial neural network via a human trainer aims to provide live feedback to improve quality assurance.

As described herein, a plurality of systems and methods enable an intelligent multi-chain offloading cellular gateway. Example embodiments illustrate how to address current concerns from mobile network operators in order to adopt blockchain technology to implement a Zero CAPEX model strategy. As such, example embodiments set forth novel solutions for building and deploying massively scalable decentralized mobile networks while adapting to fit the constraints of real-time communications and blockchain networks. Those skilled in the art will appreciate that this invention and some of its disclosures are not limited just to 4G & 5G mobile networks but will be forward-compatible to 6G and beyond. Certain implementations may further include fully automated operations (e.g., customer acquisition, customer support) using artificial intelligence (e.g., an enhanced virtual connectivity agent) and decentralized autonomous organization (DAO) mechanisms to implement a Zero OPEX model.

Figure 10:
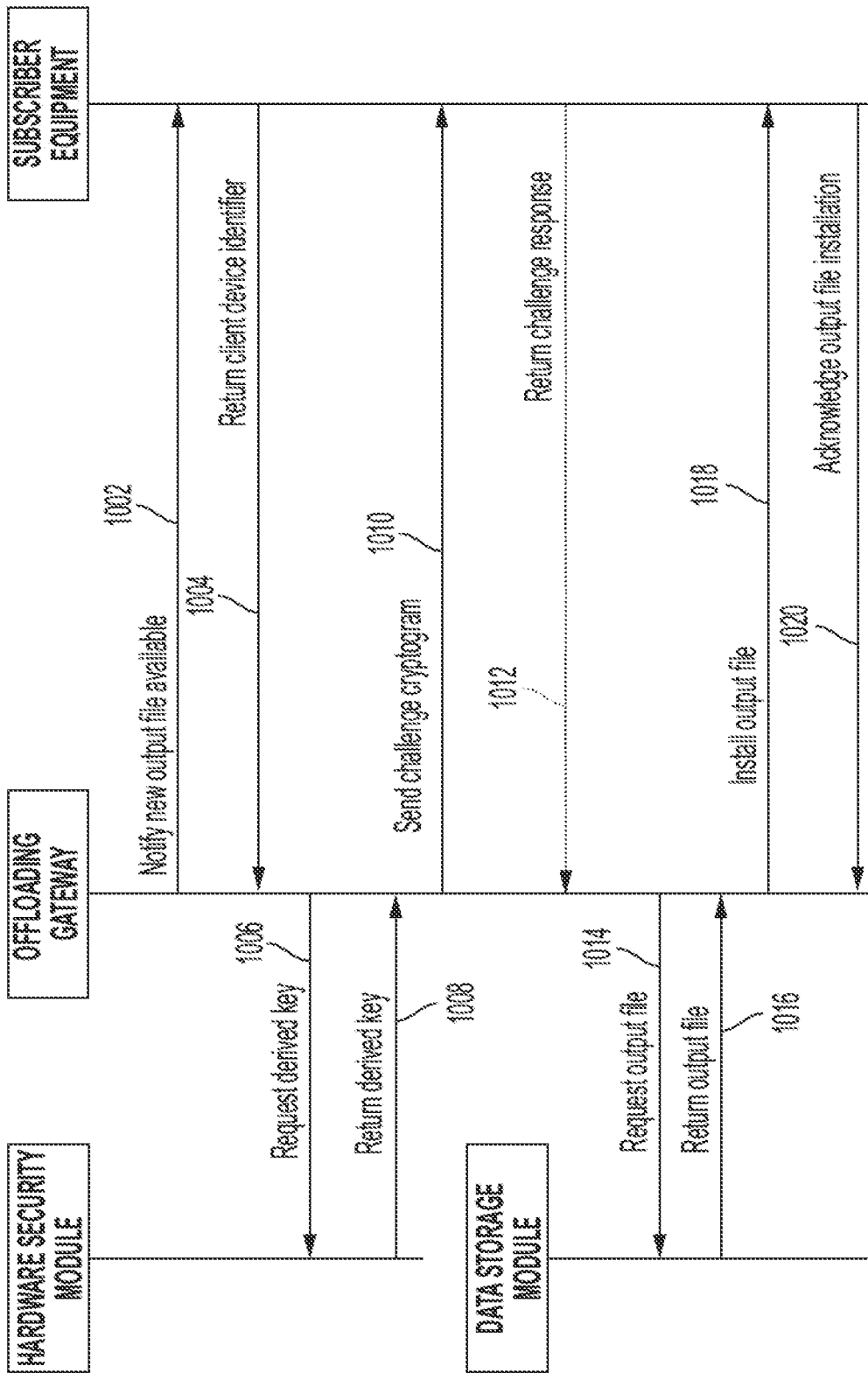
FIG. 10 illustrates a sequence diagram illustrating the installation of a machine learning model in a eUICC/iUICC, in accordance with example embodiments described herein.

Example System Interaction for Installation of an Output File on Subscriber Equipment FIG. 10 shows a sequence diagram illustrating example operations performed by various devices depicted in FIG. 2 to install a machine learning model in a eUICC/iUICC of a subscriber equipment. The operations shown in the swim lane diagram performed by a hardware security module associated with a platform server are shown along the line extending from the box labeled "Hardware Security Module," operations performed by an offloading gateway associated with the platform server are shown along the line extending from the box labeled "offloading gateway," operations performed by a data storage module of the platform server are shown along the line extending from the box labeled "data storage module," and operations performed by subscriber equipment are shown along the line extending from the box labeled "subscriber equipment." Operations impacting multiple devices, such as data transmissions between the devices, are shown using arrows extending between these lines. Generally, these operations are ordered temporally with respect to one another. However, it will be appreciated that the operations may be performed in other orders from those illustrated in FIG. 10.

At operation 1002, the offloading gateway may notify the subscriber equipment that a new output file is available. In response, at operation 1004, the subscriber equipment may respond with a client device identifier. At operation 1006, the offloading gateway may then request a derived key from the hardware security module, which may return the derived key at operation 1008. At operation 1010, the offloading gateway may send a challenge cryptogram to the subscriber equipment, which may respond with a challenge response at operation 1012. Assuming that the challenge response is authentic, the offloading gateway may request an output file from the data storage module at operation 1014, and at operation 1016, the data storage module may produce the output file. At operation 1018, the offloading gateway may thereafter cause installation of the output file on the subscriber equipment, which may, at operation 1020, circulate an acknowledgment regarding installation of the output file. Following installation of the output file, the subscriber equipment is enabled to utilize the functionality of the output file. For instance, where the output file is a machine learning model, the subscriber equipment may utilize the machine learning model to facilitate various operations as described herein.

Example Implementing Apparatuses

Figure 11:
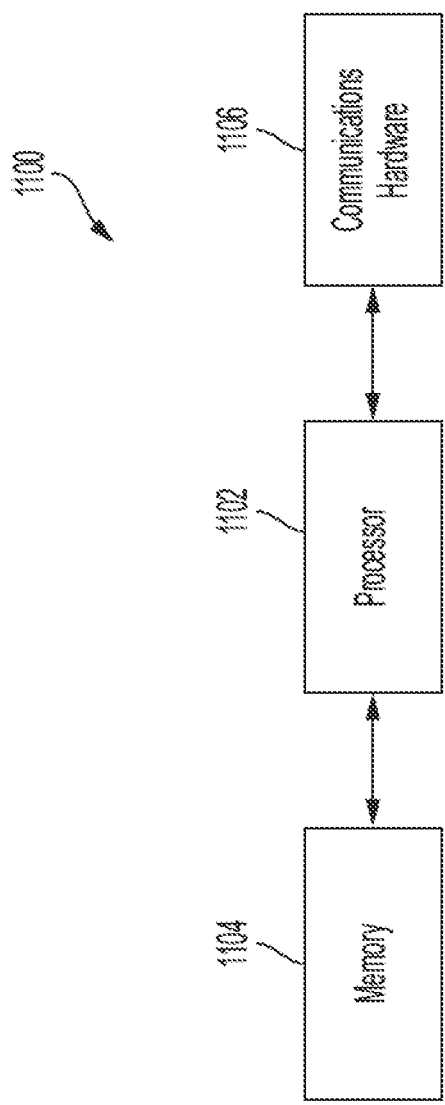
FIG. 11 illustrates a high-level example illustration of a subscriber equipment that may operate in connection with various embodiments described herein.

The subscriber equipment 206 and platform server 207 may be embodied by respective computing devices, an individual example of which is shown as apparatus 1100 in FIG. 11. The apparatus 1100 may include a processor 1102, memory 1104, and communications hardware 1106, each of which will be described in greater detail below. While the various components are only illustrated in FIG. 11 as being connected with processor 1102, it will be understood that the apparatus 1100 may further comprises a bus (not expressly shown in FIG. 11) for passing information amongst any combination of the various components of the apparatus 1100. The apparatus 1100 may be configured to execute various operations described above using these various components.

The processor 1102 (and/or co-processor or any other processor assisting or otherwise associated with the processor) may be in communication with the memory 1104 via a bus for passing information amongst components of the apparatus. The processor 1102 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 1100, remote or "cloud" processors, or any combination thereof.

The processor 1102 may be configured to execute software instructions stored in the memory 1104 or otherwise accessible to the processor 1102 (e.g., software instructions stored on a separate storage device). In some cases, the processor 1102 may be configured to execute hard-coded functionality. As such, whether configured by hardware or software methods, or by a combination of hardware with software, the processor 1102 represent an entity (e.g., physically embodied in circuitry) capable of performing operations according to various embodiments of the present invention while configured accordingly. Alternatively, as another example, when the processor 1102 is embodied as an executor of software instructions, the software instructions may specifically configure the processor 1102 to perform the algorithms and/or operations described herein when the software instructions are executed.

Memory 1104 is non-transitory and may include, for example, one or more volatile and/or non-volatile memories. In other words, for example, the memory 1104 may be an electronic storage device (e.g., a computer readable storage medium). The memory 1104 may be configured to store information, data, content, applications, software instructions, or the like, for enabling the apparatus to carry out various functions in accordance with example embodiments contemplated herein.

The communications hardware 1106 may be any means such as a device or circuitry embodied in either hardware or a combination of hardware and software that is configured to receive and/or transmit data from/to a network and/or any other device, circuitry, or module in communication with the apparatus 1100. In this regard, the communications hardware 1106 may include, for example, a cellular network interface for enabling communications with a communication network. For example, the communications hardware 1106 may include one or more network interface cards, antennas, buses, switches, routers, modems, and supporting hardware and/or software, or any other device suitable for enabling communications via a network. Furthermore, the communications hardware 1106 may include the processing circuitry for causing transmission of such signals to a network or for handling receipt of signals received from a network.

The communications hardware 1106 may further be configured to provide output to a user and, in some embodiments, to receive an indication of user input. In this regard, the communications hardware 1106 may comprise a user interface, such as a display, and may further comprise the components that govern use of the user interface, such as a web browser, mobile application, dedicated client device, or the like. In some embodiments, the communications hardware 1106 may include a touch screen, touch areas, soft keys, a microphone, a speaker, a keyboard, a mouse, and/or other input/output mechanisms. The communications hardware 1106 may utilize the processor 1102 to control one or more functions of one or more of these user interface elements through software instructions (e.g., application software and/or system software, such as firmware) stored on a memory (e.g., memory 1104) accessible to the processor 1102.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An offloading gateway of a platform server, the offloading gateway comprising:
    an artificial intelligence system configured to generate matching scores for available access gateways associated with a plurality of blockchain-based mobile networks, wherein each matching score is indicative of expected network integrity of a particular access gateway for a particular user equipment comprising a decentralized SIM hosting a Java Card applet configured locally with a trained artificial neural network that is also used by the offloading gateway to autonomously connect with blockchain-based mobile networks;
    a cellular network interface configured to enable communication with the particular user equipment; and
    a blockchain interface,
    wherein the artificial intelligence system is configured to facilitate, in conjunction with the cellular network interface and the blockchain interface, handover of the particular user equipment between two of the available access gateways associated with the plurality of blockchain-based mobile networks based on an identification of a highest matching score between the two available access gateways, and the expected network integrity is determined based on a secure exchange of proof-of-coverage information and proof-of-quality information between the offloading gateway and the particular user equipment.

2. The offloading gateway of claim 1, wherein the cellular network interface is configured to enable communication with a user equipment using electronic subscription identity module applications installed in a universal integrated circuit chip of the user equipment to securely exchange the proof-of-coverage information and the proof-of-quality information between the offloading gateway and the user equipment.

3. The offloading gateway of claim 2, wherein securely exchanging information between the offloading gateway and the user equipment comprises:
    using asymmetric keys for mutual authentication;

sharing auditable network measurement tasks; and assigning scores to all decentralized network nodes visited by the user equipment.

4. The offloading gateway of claim 2, wherein the cellular network interface is configured to securely exchange information, with a dedicated chip installed into the user equipment, using a binary tag-length-value encoded scheme, and based on knowledge of a corresponding specific low-level instruction set.

5. The offloading gateway of claim 4, wherein the cellular network interface is configured to enable receipt of an output file from a user interface via a mutually authenticated session, wherein the mutually authenticated session is established through exchange of session keys derived from asymmetric secret keys stored locally at the offloading gateway and the user equipment in a tamper-resistant hardware.

6. The offloading gateway of claim 5, wherein the tamper-resistant hardware comprises one or more smart cards.

7. The offloading gateway of claim 5, wherein the tamper-resistant hardware comprises embedded or integrated universal integral circuit chip cards.

8. The offloading gateway of claim 6, wherein the user equipment authenticates to the offloading gateway using asymmetric keys stored locally in the tamper-resistant hardware.

9. The offloading gateway of claim 1, wherein the blockchain interface is configured to facilitate signature, by the offloading gateway, of one or more smart contracts governing handover between the available access gateways associated with the plurality of blockchain-based mobile networks.

10. The offloading gateway of claim 9, wherein execution, by a remote server, of a smart contract signed by the offloading gateway causes automatic initiation of a handover of a user equipment based on rules established by the smart contract.

11. The offloading gateway of claim 10, wherein the remote server is hosted in a cloud or by a local access gateway connected to a cellular antenna communicating with the user equipment over a radio interface, wherein the cellular network interface is configured to interact with the remote server to facilitate handover of the user equipment.

12. The offloading gateway of claim 11, wherein the cellular network interface is configured to interact with the user equipment to facilitate asynchronous performance, by the user equipment, of proof-of-coverage and proof-of-quality operations.

13. A method for facilitating handover between available access gateways associated with a plurality of blockchain-based mobile networks by an offloading gateway comprising an artificial intelligence system, a cellular network interface configured to enable communication with a particular user equipment, and a blockchain interface, the method comprising:

generating, by the artificial intelligence system, matching scores for the available access gateways associated with the plurality of blockchain-based mobile networks, wherein each matching score is indicative of expected network integrity of a particular access gateway for the particular user equipment comprising a decentralized SIM hosting a Java Card applet configured locally with a trained artificial neural network that is also used by the offloading gateway to autonomously connect with blockchain-based mobile networks; and facilitating, by the artificial intelligence system and in conjunction with the cellular network interface and the blockchain interface, handover of the particular user equipment between two of the available access gateways associated with the plurality of blockchain-based mobile networks based on an identification of a highest matching score between the two available access gateways, and the expected network integrity is determined based on a secure exchange of proof-of-coverage information and proof-of-quality information between the offloading gateway and the particular user equipment.

14. The method of claim 13, further comprising:

communicating, via the cellular network interface, with a user equipment using electronic subscription identity module applications installed in a universal integrated circuit chip of the user equipment to securely exchange the proof-of-coverage information and the proof-of-quality information between the offloading gateway and the user equipment.

15. The method of claim 14, wherein securely exchanging information between the offloading gateway and the user equipment comprises:

using asymmetric keys for mutual authentication;
sharing auditable network measurement tasks; and
assigning scores to all decentralized network nodes visited by the user equipment.

16. The method of claim 13, further comprising:

facilitating, by the blockchain interface, signature of one or more smart contracts by the offloading gateway, wherein the one or more smart contracts govern handover between the available access gateways associated with the plurality of blockchain-based mobile networks.

17. The method of claim 13, further comprising:

securely exchanging, by the cellular network interface, information with a dedicated chip installed into the user equipment using a binary tag-length-value encoded scheme and based on knowledge of a corresponding specific low-level instruction set.

18. The method of claim 17, further comprising:

receiving, by the cellular network interface, an output file from a user interface via a mutually authenticated session, wherein the mutually authenticated session is established through exchange of session keys derived from asymmetric secret keys stored locally at the offloading gateway and the user equipment in tamper-resistant hardware.

19. The method of claim 18, wherein the tamper-resistant hardware comprises one or more smart cards.

20. The method of claim 13, wherein execution, by a remote server, of a smart contract signed by the offloading gateway causes automatic initiation of a handover of a user equipment based on rules established by the smart contract.

21. The method of claim 20, wherein the remote server is hosted in a cloud or by a local access gateway connected to a cellular antenna communicating with the user equipment over a radio interface, wherein the cellular network interface is configured to interact with the remote server to facilitate handover of the user equipment.

* * * * *